US008744085B2

(12) United States Patent
Tang et al.

(10) Patent No.: US 8,744,085 B2
(45) Date of Patent: Jun. 3, 2014

(54) HIERARCHICAL GROUP KEY MANAGEMENT APPROACH BASED ON LINEAR GEOMETRY

(75) Inventors: Shaohua Tang, Guangzhou (CN); Yujun Liang, Guangzhou (CN); Jintai Ding, Guangzhou (CN)

(73) Assignee: South China University of Technology (SCUT), Guangzhou, Guangdong (CN)

( * ) Notice: Subject to any disclaimer, the term of this patent is extended or adjusted under 35 U.S.C. 154(b) by 0 days.

(21) Appl. No.: 13/386,362

(22) PCT Filed: May 27, 2010

(86) PCT No.: PCT/CN2010/073318
§ 371 (c)(1),
(2), (4) Date: Jan. 20, 2012

(87) PCT Pub. No.: WO2011/147092
PCT Pub. Date: Dec. 1, 2011

(65) Prior Publication Data
US 2013/0058479 A1    Mar. 7, 2013

(51) Int. Cl.
*H04L 9/00*    (2006.01)
(52) U.S. Cl.
USPC ........................................... 380/277; 380/46
(58) Field of Classification Search
USPC .................................................. 380/277, 46
See application file for complete search history.

(56) References Cited

U.S. PATENT DOCUMENTS 5,835,592 A * 11/1998 Chang et al. ................... 380/285
7,239,701 B1 * 7/2007 Ogishi et al. .................... 380/44
(Continued)

FOREIGN PATENT DOCUMENTS

| CN | 1633774 A | 6/2005 |
| CN | 101431414 A | 5/2009 |
| CN | 101473626 A | 7/2009 |
| KR | 10-0728260 B1 | 6/2007 |

OTHER PUBLICATIONS

Tang, Shaohua, Jintai Ding, and Yujun Liang. "A Simple and Efficient New Group Key Management Approach Based on Linear Geometry." IACR Cryptology ePrint Archive 2011 (2011): 225.*

(Continued)

*Primary Examiner* — Kambiz Zand
*Assistant Examiner* — Michael Guirguis
(74) *Attorney, Agent, or Firm* — Morrison & Foerster LLP

(57) ABSTRACT

A hierarchical group key management approach based on linear geometry is disclosed. The approach includes the following steps: step 1, the central controller selects a finite field F, a mapping parameter f and a constant N for use in the group; the central controller selects a N-dimensional private vector for each subgroup; step 2, the central controller selects a mapping parameter r and maps the private vector to a new set of vectors in the vector space; step 3, the central controller selects a subgroup key for each subgroup and constructs n linear systems of equations, and solves the solution of the linear equation systems, that is, the public vector, and the n sets of public vectors form a public vector; the public vector and the mapping parameter r are broadcasted or multicasted by the central controller to all the subgroup controllers; step 4, each subgroup controller solves the confidential vector of its own, and a set of key vectors is obtained by linear transformation of the confidential vector and the public matrix. This invention is simple and flexible, and is effective against brute-force attacks.

13 Claims, 10 Drawing Sheets

(56) References Cited

U.S. PATENT DOCUMENTS

| | | | |
|---|---|---|---|
| 2003/0179885 A1 | 9/2003 | Gentry et al. | |
| 2006/0002562 A1* | 1/2006 | Berenstein et al. | 380/278 |
| 2010/0040236 A1* | 2/2010 | Xu et al. | 380/279 |
| 2010/0329454 A1* | 12/2010 | Takashima | 380/44 |
| 2011/0058668 A1* | 3/2011 | Yang et al. | 380/44 |

OTHER PUBLICATIONS

Okamoto, Tatsuaki, and Katsuyuki Takashima. "Hierarchical predicate encryption for inner-products." Advances in Cryptology—ASIACRYPT 2009. Springer Berlin Heidelberg, 2009. 214-231.*

Li-Na et al., "Group Key Management Protocol by Using Geometric Approach and Binary Key Tree", Computer Science, vol. 36, No. 11, 2009, 6 pages (Translation of Abstract only).

International Search Report received for PCT Patent Application No. PCT/CN2010/073318, mailed on Jan. 27, 2011, 6 pages (3 pages of English translation and 3 pages of PCT Search Report).

* cited by examiner

HIERARCHICAL GROUP KEY MANAGEMENT APPROACH BASED ON LINEAR GEOMETRY

CROSS REFERENCE TO RELATED APPLICATIONS

This is a U.S. National Phase patent application of PCT/CN2010/073318, filed May 27, 2010, which is hereby incorporated by reference in the present disclosure in its entirety.

FIELD OF THE INVENTION

The present invention relates to a group key management approach in the network security, and in particular to a hierarchical group key management approach based on linear geometry and the theory of orthogonal vectors.

BACKGROUND OF THE INVENTION

With the rapid development of Internet technology and the popularization of multicast, group-oriented applications, such as video conference, network games, and video on demand, etc., play more and more important roles. Secure group communication becomes an important research aspect. The secure group communication with hierarchical access control relates to a group with a series of subgroups having different access permissions, higher level subgroups receive and decrypt the information sent by its descendant subgroups (direct or indirect), but not vice versa. For the hierarchical access control based on cryptography, the higher level subgroups can obtain/derive the communication key of its descendant subgroups directly or indirectly, while the lower level subgroups can not derive the communication keys of its ancestor subgroups.

Normally, hierarchical access control has the following settings: (1) hierarchical relationship can be represented by Directed Acyclic Graph (DAG); (2) a central controller (CC) is used to manage the hierarchical relationship, and calculate and distribute the keys; (3) in the DAG, each node represents a set of users, and each node is called a subgroup; (4) each subgroup has a subgroup controller (SC) for distributing the subgroup key to each subgroup member; (5) between CC and SC, there is a secure channel for secure communication when the initialization of system or a new subgroup joins in the group; (6) in each subgroup, there is a secure key management scheme for implementing the key management in the subgroup.

These days, there are various approaches in the hierarchical access control. The typical schemes include Akl-Taylor scheme, Lin scheme, Sandhu scheme, Chinese Remainder Theorem (CRT) scheme, etc.

The Akl-Taylor scheme is a key directly dependent scheme based on one-way function. The key of a descendant subgroup is generated by the key of its ancestor subgroup via the one-way function, and the ancestor subgroup can calculate the key of its descendant subgroup directly while the descendant subgroup can not select the key of its own. The advantage of this scheme is that all the nodes do not need to memorize the hierarchical structure, and only have to store the key of its own. The disadvantage of this scheme is that the hierarchical structure is static, and a small variation in the structure will result in the update of all the nodes in the hierarchical structure.

There are also other schemes such as Mackinnon scheme, Chick and Tavares scheme and so on, which can be regarded as the improvements to the Akl-Taylor scheme.

The Lin scheme is a key indirectly dependent scheme based on one-way function. The key of a descendant subgroup is independent of the key of its ancestor subgroup, and the ancestor subgroup can derive the key of its descendant subgroup indirectly. The advantage of this scheme is that the descendant subgroups can change the key independently without affecting the key of the other subgroups. The disadvantage of this scheme is that the subgroups have to memorize the entire hierarchical structure, at least all its descendant subgroups. Furthermore, some auxiliary variables for deriving the keys of the descendant subgroups have to be stored.

The Sandhu scheme is based on the tree structure in which each node has a name. The root node of the tree selects a key randomly, and the key of each other node is obtained by encrypting its name with the key of its ancestor subgroup. A subgroup can obtain the keys of its descendant subgroups by encryption, while a descendant subgroup can not calculate the key of its ancestor subgroup. The advantage of this scheme is that each subgroup only needs to store the information of its own, and the change of the level of a subgroup will only affect the key update of its descendant subgroups. The disadvantage of this scheme is that the subgroups have to memorize some group information, and at least the group information of all its descendant subgroups, and it is only adapted for hierarchical model with tree structure.

In the CRT scheme, the hierarchical structure is hidden in a constructed CRT variable by CRT algorithm, and all ancestor subgroups of a subgroup can calculate the key of this subgroup, while this subgroup can not know which subgroups are its ancestor subgroups. The ancestor subgroups do not know the specific path to the subgroup either, and can only calculate its key. This scheme provides good security, but the disadvantage is that the cost to compute the CRT variable is very large, and it grows proportionally as the number of subgroups increases, and thereby the scalability of the scheme is not good enough.

SUMMARY OF THE INVENTION

It is a first object of the present invention to provide a hierarchical group key management approach based on linear geometry, which is constructed based on a theory of polynomial function in a vector space over a finite field. This approach is simple and flexible, and is effectively against brute-force attacks.

It is a second object of the present invention to provide a further hierarchical group key management approach based on linear geometry, which is constructed based on a further theory of polynomial function in a vector space over a finite field. This approach requires small memory, little computation, high security and is effectively against brute-force attacks.

The first object of the present invention is achieved by the following technical solution: A hierarchical group key management approach based on linear geometry, comprises the following steps:

step 1: a central controller CC selects a mapping f and a finite field F for use by the group, and all computations in the group are performed over the finite field F; moreover, a constant N is determined by the central controller to be used as a upper limit of the number of subgroups; the central controller sends the finite field F, the constant N and the mapping f to all subgroup controllers; suppose the group has n subgroups, the central controller assigns a serial number for each subgroup and sends each serial number to each subgroup controller; the central controller selects a N-dimensional private vector randomly for each subgroup, and sends each N-dimensional private vector to each subgroup controller correspondingly via secure channel; the subgroup controllers receive and store the N-dimensional private vectors from the central controller and keep secret, wherein N and n are positive integers, and n≤N;

step 2: the central controller selects a mapping parameter r in the finite field F, and maps the private vectors of all the subgroup controllers into a new set of vectors called confidential vectors by using the mapping f according to the mapping parameter r; if the new set of vectors is linearly dependent, then the mapping parameter is reselected to perform remapping, or return to the step 1 to allow each subgroup controller to reselect a private vector, until the new set of vectors is linearly independent;

step 3: the central controller selects a subgroup key in the finite field F for each subgroup; the central controller constructs n linear systems of equations according to the hierarchy relationship of the subgroups by using the confidential vectors and the subgroup keys, and calculates the unique solutions of the linear systems of equations which are called public vectors; the confidential vectors and the public vectors are subject to the following regulations: (1) the confidential vectors of lower level nodes are orthogonal to the public vectors of higher level nodes, and the inner product is zero; (2) for all the nodes, the inner product of the confidential vector and the public vector of a current node itself is the group key of the current node; (3) if the higher level node is a parent node or ancestor node of the current node, the inner product of the confidential vector of the higher level node and the public vector of the current node is the group key of the current node; the inner product of the confidential vector of the higher level node and the public vector of a descendant node is the group key of the descendant node; (4) the nodes without direct nor indirect ancestor-descendant relationship with respect to each other can not derive the keys of the other, and the inner product of the confidential vector of one node and the public vector of the other node is zero; (5) the key of one node can not be derived by the other node between brother nodes, and the inner product of the confidential vector of one node and the public vector of the other is zero. n sets of public vectors form a public matrix, the public matrix and the mapping parameter r are broadcasted or multicasted by the central controller to all the subgroup controllers via open channel;

step 4: after receiving the public matrix and the mapping parameter, each subgroup controller maps the private vector of its own to a new vector in a vector space according to the mapping parameter, and solves the confidential vector of its own, then a set of key vectors is obtained by the linear transformation of the confidential vector and the public matrix. The subgroup controller can obtain the group key of its own and all its descendant subgroups through the key vector calculated by itself, while it can not calculate the group keys of its parent group and ancestor groups; the subgroup controller distributes the calculated group keys to group members.

Preferably, the step 1 is implemented by the following:

the central controller determines a finite field F, a constant N and a mapping f, and sends the finite field F, the constant N and the mapping f to all the subgroup controllers; the central controller assigns a serial number $SC_i$ to each subgroup controller, and sends the serial number $SC_i$ to each subgroup controller by broadcasting or multicasting; the central controller selects a N-dimensional private vector $Z_i=(z_{i,1}, z_{i,2}, \ldots, z_{i,N})$ randomly for each subgroup $V_i$ and sends the private vector to the corresponding subgroup controller $SC_i$ via secure channel; each subgroup controller $SC_i$ receives and stores the private vector $Z_i=(z_{i,1}, z_{i,2}, \ldots, z_{i,N})$ and keeps secret;

Preferably, the step 2 is implemented by the following:

the central controller selects a mapping parameter r in the finite field F, and maps the private vectors $Z_i=(z_{i,1}, z_{i,2}, \ldots, z_{i,N})$ of all the subgroups into a new set of vectors called confidential vectors by using the mapping f;

for a subgroup controller with a serial number $SC_i$:

$$x_{i,1} = f(z_{i,1}r)$$
$$x_{i,2} = f(z_{i,2}r)$$
$$\ldots,$$
$$x_{i,n} = f(z_{i,n}, r)$$

then, the central controller obtains a new set of vectors in the finite field F:

$$X_1 = (x_{1,1}, x_{1,2}, \ldots, x_{1,n}),$$
$$X_2 = (x_{2,1}, x_{2,2}, \ldots, x_{2,n}),$$
$$\ldots,$$
$$X_n = (x_{n,1}, x_{n,2}, \ldots, x_{n,n})$$

the central controller judges whether $X_1, X_2, \ldots, X_n$ are linearly dependent, and if they are linearly dependent, then proceed to the step 2, or return to the step 1 to allow the subgroup controller to reselect a private vector until the new set of vectors are linearly independent; or else proceed to step 3 (notice that the linearly independent vector $X_1, X_2, \ldots, X_n$ can be easily obtained since r is a random number);

the step 3 is implemented by the following:

the central controller selects a random number for each subgroup in the finite field F to be used as a key of the subgroup and suppose the selected random numbers are $k_1, k_2, \ldots, k_n$ wherein $k_i \neq 0$. For any subgroup $V_i$, let $P(i)$ represent the set of all ancestor nodes of the subgroup $V_i$. Suppose the public vector $A_i=(a_{i,1}, a_{i,2}, \ldots, a_{i,n})$ is an unknown parameter, then the public vector $A_i$ and the confidential vector $X_j$ of each subgroup have the following relationship:

$$X_j \times A_i^T = \begin{cases} k_i, & \text{if } j = i \text{ or } V_j \in P(i) \\ 0, & \text{if } V_j \notin P(i) \text{ and } j \neq i \end{cases} \quad (1)$$

the equation (1) has the following meaning: (1) for any subgroup $V_i$, suppose its confidential vector is $X_i$, the public vector is $A_i$ and the key is $k_i$, then $X_i \times A_i^T = k_i$; (2) for other subgroups $V_j$ (j=1, \ldots, n and j≠i), the confidential vector is represented by $X_j$, and if $V_j$ is the parent node or grandparent node of $V_i$, then $X_j \times A_i^T = k_i$, while if $V_j$ is not the parent node nor grandparent node of $V_i$, then $X_j \times A_i^T = 0$;

from the equation (1): suppose $X=(X_1, X_2, \ldots, X_n)^T$, $K_i=(c_{i,1}, c_{i,2}, \ldots, c_{i,n})^T$, $$c_{i,j} = \begin{cases} k_i, & \text{if } j = i \text{ or } V_j \in P(i) \\ 0, & \text{if } V_j \notin P(i) \text{ and } j \neq i, \end{cases}$$

then the equation (1) is converted into:

$$X \times A_i^T = K_i \quad (2)$$

Let $A=(A_1^T, A_2^T, \ldots, A_n^T)$, $K=(K_1, K_2, \ldots, K_n)$, then for all subgroups $V_i$:

$$X \times A = K_i \quad (3)$$

the central controller needs to solve the system of equations (3), and the system of equations (3) has a unique solution since the linear independence of $X_1, X_2, \ldots, X_n$ in the step 2 guarantees the coefficient matrix determinant $|X| \neq 0$, and A is the public matrix solved;

the public matrix $A=(A_1^T, A_2^T, \ldots, A_n^T)$ and the mapping parameter r are broadcasted or multicasted by the central controller to all the subgroup controllers via open channel;

the step 4 is implemented by the following:

each subgroup controller receives the public matrix $A=(A_1^T, A_2^T, \ldots, A_n^T)$ and the mapping parameter r, and calculates $X_i=(x_{i,1}, x_{i,2}, \ldots, x_{i,n})$ via the mapping f:

$$x_{i,1} = f(z_{i,1}, r)$$
$$x_{i,2} = f(z_{i,2}, r)$$
$$\ldots,$$
$$x_{i,n} = f(z_{i,n}, r)$$

then calculates:

$$k_i = X_i \times A_i^T = x_{i,1} a_{i,1} + x_{i,2} a_{i,2} + \ldots + x_{i,n} a_{i,n} \quad (4)$$

$$t_j = X_i \times A_j^T = x_{j,1} a_{i,1} + x_{j,2} a_{i,2} + \ldots + x_{j,n} a_{i,n} (j \neq i) \quad (5)$$

the equation (4) has the following meaning: for any subgroup $V_i$, suppose the confidential vector calculated by its subgroup controller $SC_i$ is $X_i$ and the public vector received is $A_i$, then $SC_i$ calculates the group key $k_i = X_i \times A_i^T$;

the equation (5) has the following meaning: for any subgroup $V_i$, suppose the confidential vector calculated by its subgroup controller $SC_i$ is $X_i$, the public vector of other subgroups $V_j$ ($j=1, \ldots, n$ and $j \neq i$) in the group is represented as $A_j$, then $SC_i$ calculates the group key $t_j = X_i \times A_j^T$ of $V_j$, and if $V_j$ is the direct or indirect descendant subgroup of $V_i$, then $t_j \neq 0$ and $t_j$ is the group key of the subgroup $V_j$, while if $V_j$ is not the direct nor indirect descendant subgroup of $V_i$, then $t_j = 0$, and $V_i$ can not calculate the group key of $V_j$.

wherein P(j) represents the set of all ancestor nodes of the subgroup $V_j$; if $V_i \in P(j)$, then $t_j = k_j$, i.e. $t_j$ is equal to the group key of $V_j$; or else, $t_j = 0$; each subgroup $V_i$ can easily calculate its group key or the group keys of its descendant nodes via the equations (4) and (5);

the subgroup controller $SC_i$ distributes the calculated $k_i$ and $t_j$ ($j \neq i$) to each group member (the specific delivering process is determined by the key management scheme in the group).

When ordinary members (not subgroup controllers) apply to join in the subgroup, the hierarchical group key management approach based on linear geometry further comprises:

step 5, when ordinary members (not subgroup controllers) request to join in, suppose the current group has n subgroups, wherein g subgroups have new members requesting to join in, then the controllers of the subgroups, where the new users join, send the joining request to the central controller (the new members can be allowed simultaneously to join in the group by bulk processing), wherein $g \leq n$; repeat the steps 2 to 4.

When ordinary members (not subgroup controllers) apply to leave the subgroup, the hierarchical group key management approach based on linear geometry further comprises:

step 5, when ordinary members (not subgroup controllers) request to leave the group: suppose the current group has n subgroups, wherein g subgroups have members requesting to leave, then the controllers of the subgroups, where users request to leave, send the leaving request to the central controller (the update of key can be done by bulk processing), wherein $g \leq n$;

repeat the steps 2 to 4.

When ordinary members (not subgroup controllers) request to join in and ordinary members request to leave, the hierarchical group key management approach based on linear geometry further comprises:

step 5, when a large number of ordinary members join in and leave, that is, a large number of new users request to join in some subgroups while some members in some subgroups apply to leave, then the controllers of the subgroups, where the new users join, send the joining request to the central controller, and subgroup controllers which users request to leave send the leaving request to the central controller;

repeat the steps 2 to 4.

A subgroup may be split into new subgroups, and the new subgroups will join in the system after the new subgroups select new subgroup controllers; the hierarchical group key management approach based on linear geometry further comprises:

step 5, when new subgroups join in, the central controller assigns a serial number to each subgroup controller and sends the serial number to all the subgroup controllers; meanwhile, the central controller selects a N-dimensional private vector over the finite field F for each new subgroup and sends the N-dimensional private vector to the corresponding subgroup controller via secure channel; the new subgroup controllers receive the private vectors sent by the central controller and keep secret; the central controller sends the finite field F, the constant N and the mapping f to the new subgroup controllers;

repeat the steps 2 to 4.

The deletion or combination of subgroups will cause the leaving of subgroup controller members; and the hierarchical group key management approach based on linear geometry further comprises:

step 5, when subgroups need to leave, each subgroup member that needs to leave applies to the central group controller for leaving the group; the central group controller deletes the private vectors of the leaving subgroups, and reassigns serial numbers according to the size order of the subscripts of the current subgroup members, and sends the serial numbers to all subgroup controllers by broadcasting or multicasting;

repeat the steps 2 to 4.

When a large number of subgroup controller members join in and a large number of subgroup controller members leave simultaneously, the hierarchical group key management approach based on linear geometry further comprises:

step 5: when a large number of new subgroup controllers join in and a large number of subgroup controllers leave simultaneously, each leaving subgroup controller applies to the central controller for leaving; the central controller deletes the private vector of the leaving subgroup controller, and reassigns serial numbers for the remaining subgroup controllers according to the size order of the subscripts of the current subgroup controllers while assigns a serial number for each new subgroup controller, then sends the serial numbers to all subgroup controllers; the central controller selects a N-dimensional private vector randomly over the finite field F for each new joining subgroup, and sends the N-dimensional private vector to the corresponding subgroup controller; the new joining subgroup controllers receive the private vector sent by the central controller and keep secret; the central controller sends the finite field F, the constant N and the mapping f to the new joining subgroup controllers;

repeat the steps 2 to 4.

When ordinary users and subgroup controller users join in together, and/or ordinary users and subgroup controller users leave simultaneously, the hierarchical group key management approach based on linear geometry further comprises:

step 5: when a large number of ordinary users and subgroup controllers join in, and/or ordinary users and subgroup controllers leave simultaneously, each leaving subgroup controller applies to the central controller for leaving; the subgroup controllers which the ordinary users join in or leave send a request for updating the key to the central controller; the central controller deletes the private vectors of the leaving controller, and reassigns serial numbers according to the size order of the subscripts of the current subgroup members while assigns a serial number to each new joining subgroup controller, and then sends the serial numbers to all subgroup controllers; the central controller selects a N-dimensional private vector over the finite field for each new joining subgroup, and sends the N-dimensional private vector to the corresponding subgroup controller via secure channel; the new joining subgroup controllers receive the private vectors sent by the central controller and keep secret; the central controller sends the finite field F, the constant N and the mapping f to the new joining subgroup controllers;

repeat the steps 2 to 4.

The second object of the present invention is achieved by the following technical solution:

A hierarchical group key management approach based on linear geometry, comprises the following steps:

step 1: a central controller CC selects a mapping f and a finite field F for use by a group, all computations in the group are performed over the finite field; a constant m is determined by the central controller; the central controller sends the finite field F, the constant m and the mapping f to all subgroup controllers; suppose the group has n subgroups, the central controller assigns a serial number for each subgroup and sends each serial numbers to each subgroup controller; the central controller selects a m-dimensional private vector and a two-dimensional private vector randomly for each subgroup, and sends them to the corresponding subgroup controller via secure channel; the subgroup controllers receive and store the m-dimensional private vectors and the two-dimensional private vectors and keep secret, wherein m and n are positive integers, and 2≤m≤n;

step 2: the central controller selects a mapping parameter r in the finite field F, and maps the two-dimensional private vectors of all the subgroup controllers into a new set of vectors by using the mapping f according to the mapping parameter r, and maps the m-dimensional private vectors of all the subgroup controllers into a new set of vectors in the vector space by using the mapping f if the new set of vectors is linearly dependent, then the mapping parameter is reselected to perform remapping, or return to the step 1 to allow each subgroup controller to reselect a private vector, until the new set of vectors is linearly independent; these two new sets of subgroups are called confidential vectors;

step 3: the central controller selects a subgroup key in the finite field F for each subgroup, the central controller constructs n linear systems of equations according to the hierarchy relationship of the subgroups by using the confidential vectors and the subgroup keys, and the central controller calculates the unique solutions of the linear systems of equations which are called public vectors; the confidential vectors and the public vectors are subject to the following regulations: (1) for all the nodes, the inner product of the m-dimensional confidential vector and the public vector of a current node itself is the group key of the current node; (2) the m-dimensional confidential vectors of lower level nodes are orthogonal to the public vectors of higher level nodes, and the inner product is zero; (3) when the higher level node is a parent node or ancestor node of the current node, the inner product of the m-dimensional confidential vector of the higher level node and the public vector of all the descendant nodes is the indirect key; the higher level node further calculates the key of the descendant node via the key and the two-dimensional confidential vector of the higher level node itself; (4) for nodes without direct nor indirect ancestor-descendant relationship with respect to each other, the inner product of the m-dimensional confidential vector of one node and the public vector of the other node is zero; (5) the key of one node can not be derived by the other node between brother nodes, and the inner product of the confidential vector of one node and the public vector of the other is zero; n sets of public vectors form a public matrix, and the public matrix and the mapping parameter r are broadcasted or multicasted by the central controller to all the subgroup controllers via open channel;

step 4: after receiving the public matrix and the mapping parameter, each subgroup controller maps the two private vectors of its own to two new vectors i.e. confidential vectors, in a vector space according to the mapping parameter, and a set of key vectors is derived from linear transformation of the m-dimensional confidential vector and the public matrix, the subgroup controller obtains its group key through the key vector calculated by itself, and calculates the group keys of descendant subgroups through the key vector calculated by itself and the two-dimensional confidential vector of its own, and the descendant subgroups can not calculate the group keys of their parent groups and ancestor groups; the subgroup controller distributes the group keys calculated to group members.

Preferably, the step 1 is implemented by the following:

the central controller determines a finite field F, a constant m and a mapping f, and sends the finite field F, the constant m and the mapping f to all the subgroup controllers $SC_i$; the central controller selects a m-dimensional private vector $Z_i = (z_{i,1}, z_{i,2}, \ldots, z_{i,m})$ and a two-dimensional private vector $Y_i = (y_{i,1}, y_{i,2})$ over the finite filed F for each subgroup, and sends $Z_i$ and $Y_i$ to the corresponding subgroup controller $SC_i$ via secure channel;

the subgroup controller $SC_i$ receives and stores the private vectors $Z_i$ and $Y_i$ and keeps secret, the central controller assigns a serial number $SC_i$ for each subgroup controller, and sends the serial number $SC_i$ to all the subgroup controllers by broadcasting or multicasting, wherein i=1, . . . , n;

the step 2 is implemented by the following:

the central controller selects a mapping parameter r in the finite field F randomly, and maps the private vectors $Z_i$ of all the subgroups into a new set of vectors $X_i$ by using the mapping f, and maps the private vectors $Y_i$ of all the subgroups into a new set of vectors $W_i$, wherein $X_i$ and $W_i$ are called confidential vectors;

$$\text{for all subgroups } SC_i, i = 1, \ldots, n, \quad (1)$$
$$\text{the vector } W_i = (w_{i,1}, w_{i,2}):$$
$$w_{i,1} = f(y_{i,1}, r)$$
$$w_{i,2} = f(y_{i,2}, r)$$

-continued $$\text{for } i = 1, \ldots, m, X_i = (x_{i,1}, \ldots, x_{i,m}, 0, \ldots, 0): \quad (2)$$
$$x_{i,1} = f(z_{i,1}, r)$$
$$\ldots$$
$$x_{i,m} = f(z_{i,m}, r)$$
Let $x_{i,m+1} = \ldots = x_{i,n} = 0;$ $$\text{for } i = m+1, \ldots, n, \quad (3)$$
$$X_i = (x_{i,1}, x_{i,2}, \ldots, x_{i,m-1}, 0\ldots, 0_{x_{i,i}}, 0, \ldots, 0)$$
$$x_{i,1} = f(z_{i,1}, r)$$
$$\ldots$$
$$x_{i,m-1} = f(z_{i,m-1}, r)$$
$$x_{i,i} = f(z_{i,m}, r)$$
Let $x_{i,m} = \ldots = x_{i,i-1} = 0, x_{i,i+1} = \ldots = x_{i,n} = 0;$ then the central controller obtains a set of n-dimensional vectors consisting of $X_i$ over the finite field F:

$$X_1 = (x_{1,1}, x_{1,2}, \ldots, x_{1,n})$$
$$X_2 = (x_{2,1}, x_{2,2}, \ldots, x_{2,n})$$
$$\ldots$$
$$X_n = (x_{n,1}, x_{n,2}, \ldots, x_{n,n})$$

the central controller judges whether $X_1, X_2, \ldots, X_n$ are linearly dependent, and if they are linearly dependent, then proceed to the step 2 to reselect the mapping parameter and to perform remapping, or return to the step 1 to allow the subgroup controller to reselect a private vector until the new set of vectors are linearly independent; or else proceed to step 3, and it is very easy to obtain a set of vector $X_1, X_2, \ldots, X_n$ that are linearly independent, because r is a random number;

the step 3 is implemented by the following:

the central controller selects a group key $k_{i,i}$, $i=1, \ldots, n$, for each subgroup; for any subgroup controller $SC_i$, $i=1, \ldots, n$, suppose its public vector $A_i=(a_{i,1}, a_{i,2}, \ldots, a_{i,n})$ is an unknown parameter, and $C(V_i)$ is used to represent a set of all descendant groups of the subgroup controller $SC_i$, then the public vector $A_i$ and the confidential vector $X_j$ of each subgroup have the following relationship:

$$X_i \times A_i^T = k_{i,i}$$

suppose $V_j \in C(V_i)$, i.e. $V_j(j=1, \ldots, n)$ is the direct or indirect descendant subgroup of V and j i, then $A_j$, $X_i$, $W_i$ and $X_j$ have the following relationship:

$$\begin{cases} X_j \times A_j^T = k_{j,j} \\ X_i \times A_j^T = k_{i,j} \\ W_i \times (k_{i,i}, k_{i,j})^T = k_{j,j} \end{cases} \quad (6)$$

it is derived from the equation (6) that:

$$X_i \times A_j^T = k_{i,j} = \begin{cases} k_{i,i}, & j = i \\ (k_{j,j} - w_{i,1}k_{i,i})w_{i,2}^{-1}, & j \neq i \cap V_j \in C(V_i) \\ 0, & j \neq i \cap V_j \notin C(V_i) \end{cases} \quad (7)$$

the equation (7) has the following meaning: for any subgroup $V_i$, its n-dimensional confidential vector is $X_i$, two-dimensional confidential vector is $W_i=(w_{i,1}, w_{i,2})$, the public vector is $A_i$, and the key is $k_{i,i}$; the public vectors of all subgroups $V_j(j=1, \ldots, n)$ is represented by $A_j=(a_{j,1}, a_{j,2}, \ldots, a_{j,n})$; (1) if j=i, $A_j=A_i$ and $k_{i,j}=k_{i,i}$, and at this time, $k_{i,j}=X \times A_j^T = X_i \times A_i^T = k_{i,i}$ is the group key of the subgroup $V_i$; (2) if j≠i and $V_j$ is the direct or indirect descendant subgroup of $V_i$, the subgroup $V_i$ can calculate the group key $k_{j,j}$ of $V_j$ through the indirect key $k_{i,j}$, and it can be derived from the equation (6) that $X_i \times A_j^T = k_{i,j} = (k_{j,j} - w_{i,1}k_{i,i})w_{i,2}^{-1}$; (3) if j≠i and $V_j$ is the direct or indirect descendant subgroup of $V_i$, then $k_{i,j} = X_i \times A_j^T = 0$, and at this time, $V_i$ can not calculate the key $k_{j,j}$ of $V_j$ through $k_{i,j}$;

suppose $X=(X_1, X_2, \ldots, X_n)$, $K_i=(k_{i,1}, k_{i,2}, \ldots, k_{i,n})^T$, then the equation (7) is transformed into:

$$X \times A^T = K_i$$

let $A=(A_1^T, A_2^T, \ldots, A_n^T)$, $K=(K_1, K_2, \ldots, K_n)$, and for all the $V_i$, then:

$$X \times A = K \quad (8)$$

the equation (8) is written in the form of a system of equations:

$$\begin{bmatrix} x_{1,1} & x_{1,2} & \ldots & x_{1,n} \\ x_{2,1} & x_{2,2} & \ldots & x_{2,n} \\ \ldots & \ldots & \ldots & \ldots \\ x_{n,1} & x_{n,2} & \ldots & x_{n,n} \end{bmatrix} \times \begin{bmatrix} a_{1,1} & a_{2,1} & \ldots & a_{n,1} \\ a_{1,2} & a_{2,2} & \ldots & a_{n,2} \\ \ldots & \ldots & \ldots & \ldots \\ a_{1,n} & a_{2,n} & \ldots & a_{n,n} \end{bmatrix} = \begin{bmatrix} k_{1,1} & k_{1,2} & \ldots & k_{1,n} \\ k_{2,1} & k_{2,2} & \ldots & k_{2,n} \\ \ldots & \ldots & \ldots & \ldots \\ k_{n,1} & k_{n,2} & \ldots & k_{n,n} \end{bmatrix}$$

the central controller solves the system of equations (8), and the system of equations (8) has a unique solution: $A=X^{-1}K$, since the step 3 guarantees the coefficient matrix determinant $|X| \neq 0$, and A is the public matrix solved; the mapping parameter r and the matrix $A=(A_1^T, A_2^T, \ldots, A_n^T)$ are broadcasted or multicasted by the central controller to all the subgroup controllers via open channel;

the step 4 is implemented by the following:

when each subgroup controller receives the public matrix $A=(A_1^T, A_2^T, \ldots, A_n^T)$ and the mapping parameter r, each subgroup controller $SC_i$ calculates $W_i$ and $X_i$ according to the serial number i of its own and the mapping f:

$$\text{for all the } i = 1, \ldots, n, W_i = (w_{i,1}, w_{i,2}) \quad (1)$$
$$w_{i,1} = f(y_{i,1}, r)$$
$$w_{i,2} = f(y_{i,2}, r)$$

$$\text{for } i = 1, \ldots, m, X_i = (x_{i,1}, \ldots, x_{i,m}, 0, \ldots, 0): \quad (2)$$
$$x_{i,1} = f(z_{i,1}, r)$$
$$\ldots$$
$$x_{i,m} = f(z_{i,m}, r)$$
let $x_{i,m+1} = \ldots = x_{i,n} = 0;$ $$\text{for } i = m+1, \ldots, n, \quad (3)$$
$$X_i = (x_{i,1}, x_{i,2}, \ldots, x_{i,m-1}, 0\ldots, 0_{x_{i,i}}, 0, \ldots, 0)$$
$$x_{i,1} = f(z_{i,1}, r)$$
$$\ldots$$
$$x_{i,m-1} = f(z_{i,m-1}, r)$$
$$x_{i,i} = f(z_{i,m}, r)$$
let $x_{i,m} = \ldots = x_{i,i-1} = 0, x_{i,i+1} = \ldots = x_{i,n} = 0;$
then for all the $j = 1, \ldots, n$, calculate, -continued $$k_{i,j} = \begin{cases} X_i \times A_j^T = x_{i,1}a_{j,1} + \ldots + x_{i,m}a_{j,m}, & i \leq m \\ X_i \times A_j^T = x_{i,1}a_{j,1} + \ldots + x_{i,m-1}a_{j,m-1} + x_{i,i}, a_{j,i}, & i > m \end{cases} \quad (9)$$

the equation (9) has the following meaning: for the subgroup $V_i$, the subgroup controller is $SC_i$, the n-dimensional confidential vector is $X_i$, and the two-dimensional confidential vector is $W_i=(w_{i,1},w_{i,2})$; the public vectors of all the subgroups in the group are represented by $A_j=(a_{j,1}, a_{j,2}, \ldots, a_{j,n})$ $(j=1, \ldots, n)$; if $j=i$, then $A_j=A_i$ and $k_{i,j}=k_{i,i}$, and at this time, $k_{i,j}$ is the group key of the subgroup $V_i$; if $j \neq i$ and $k_{i,j} \neq 0$, $V_i$ can calculate the group key $k_{j,j}$ of $V_j$ through $k_{i,j}$, and $V_j$ is the direct or indirect descendant subgroup of $V_i$; if $j \neq i$ and $k_{i,j}=0$, it reveals that $V_i$ can not calculate the key $k_{j,j}$ of $V_j$; the calculation of $k_{i,j}$ has the following two situations: (1) if $1 \leq i \leq m$, $X_i=(x_{i,1}, \ldots, x_{i,m}, 0, \ldots, 0)$, then $k_{i,j}=X_i \times A_j^T=x_{i,1}a_{i,1}+ \ldots +x_{i,m}a_{j,m}$; (2) if $m+1 \leq i \leq n$, $X_i=(x_{i,1}, \ldots, x_{i,m-1}, 0, \ldots, 0, x_{i,i}, 0, \ldots, 0)$, then $k_{i,j}=X_i \times A_j^T=x_{i,1}a_{i,1}+ \ldots +x_{i,m-1}a_{j,m-1}+x_{i,i}a_{j,i}$.

if $j \neq i$, the subgroup controller $SC_i$ continues to calculate the group key $k_{j,j}$ of the subgroup $V_j$ if $k_{i,j} \neq 0$:

$$k_{j,j}=w_{i,1} \times k_{i,i}+w_{i,2} \times k_{i,j} \quad (10)$$

each subgroup controller $SC_i$ can easily calculate the key $k_{i,i}$ and the key $k_{j,j}$ of each descendant subgroup via the equations (9) and (10); the subgroup controller $SC_i$ distributes the $k_{i,i}$ and $k_{j,j}$ $(j=1, \ldots, n$ and $j \neq i)$ calculated to each group member.

When ordinary members (not subgroup controllers) request to join the subgroup, the hierarchical group key management approach based on linear geometry further comprises:

step 5, when ordinary members (not subgroup controllers) join in: suppose the current group has n subgroups, wherein g subgroups have new members requesting to join in, then the controllers of the subgroups, where new users join, send the joining request to the central controller (the new members can be allowed simultaneously to join in the group by bulk processing), wherein $g \leq n$;

repeat the steps 2 to 4.

When ordinary members (not subgroup controllers) request to leave the subgroup, the hierarchical group key management approach based on linear geometry further comprises:

step 5, when ordinary members (not subgroup controllers) request to leave the group: suppose the current group has n subgroups, wherein g subgroups have members requesting to leave, then the controllers of the subgroups, where users request to leave, send the leaving request to the central controller (the update of keys can be done by bulk processing), wherein $g \leq n$;

repeat the steps 2 to 4.

When some ordinary members (not subgroup controllers) request to join in while some ordinary members would like to leave, the hierarchical group key management approach based on linear geometry further comprises:

step 5, when a large number of ordinary members join in and leave, that is, a large number of new users request to join in some subgroups while some members in some subgroups request to leave, then the controllers of the subgroups, where the new users join, send the joining request to the central controller, and subgroup controllers which users request to leave send the leaving request to the central controller;

repeat the steps 2 to 4.

When subgroup controller members (bulk) join in, the hierarchical group key management approach based on linear geometry further comprises:

step 5: when new subgroups join in, the central controller selects a m-dimensional private vector $Z_i=(z_{i,1}, z_{i,2}, \ldots z_{i,m})$ and a two-dimensional private vector $Y_i=(y_{i,1},y_{i,2})$ for each new subgroup controller over the finite field F, and sends them to the corresponding subgroup controller; the central controller assigns a serial number to each new subgroup controller, and sends the serial number to all subgroup controllers; each new subgroup controller receives the m-dimensional private vector and the two-dimensional private vector sent by the central controller and keeps secret; the central controller sends the finite field F, the constant N, and the mapping f to the new subgroup controller;

repeat the steps 2 to 4.

When subgroup controller members (bulk) leave the group, the hierarchical group key management approach based on linear geometry further comprises:

step 5: when subgroups need to leave, each leaving subgroup member applies to the central group controller for leaving the group; the central group controller deletes the private vectors of the leaving subgroups, and reassigns serial numbers according to the size order of the subscripts of the current subgroup members, and sends the serial numbers to all subgroup controllers by broadcasting or multicasting;

repeat the steps 2 to 4.

When a large number of subgroup controller members join in and a large number of subgroup controller members leave simultaneously, the hierarchical group key management approach based on linear geometry further comprises:

step 5: each leaving subgroup controller applies to the central controller for leaving; the central controller deletes the private vector of the leaving subgroup controller, reassigns serial numbers for the subgroup controllers according to the size order of the subscripts of the current subgroup controllers, assigns a serial number to each new subgroup controller, and sends the subscript serial numbers of all members to all subgroup controllers via broadcasting or multicasting; the central controller selects a m-dimensional private vector $Z_i=(z_{i,1}, z_{i,2}, \ldots, z_{i,m})$ and a two-dimensional vector $Y_i=(y_{i,1},y_{i,2})$ randomly over the finite field F for each new joining subgroup, and sends them to the corresponding subgroup controller via secure channel; the central controller assigns a serial number to each new subgroup and sends the serial number to all the subgroup controllers; each new subgroup controller receives the m-dimensional private vector and the two-dimensional private vector sent by the central controller and keeps secret; the central controller sends the finite field F, the constant N and the mapping f to the new joining subgroup controllers;

repeat the steps 2 to 4.

When a large number of ordinary users and subgroup controllers join in, and/or ordinary users and subgroup controllers leave, the hierarchical group key management approach based on linear geometry further comprises:

step 5: when a large number of ordinary users and subgroup controllers join in, and/or ordinary users and subgroup controllers leave, each leaving subgroup controller applies to the central controller for leaving; the controllers of the subgroups, where the ordinary users join or leave, send a request for updating the key to the central controller; the central controller deletes the private vectors of the leaving subgroup controllers, and reassigns serial numbers according to the size order of the subscripts of the current subgroup members while assigns a serial number to each new joining subgroup controller, and then sends the serial numbers to all subgroup controllers via broadcasting or multicasting; the central controller selects a m-dimensional private vector $Z_i=(z_{i,1}, z_{i,2}, \ldots, z_{i,m})$ and a two-dimensional vector $Y_i=(y_{i,1},y_{i,2})$ randomly over the finite field F for each new joining subgroup, and sends them to the corresponding subgroup controller via secure channel; the central controller assigns a serial number to each new subgroup controller and sends the serial number to all the subgroup controllers; each new subgroup controller receives the m-dimensional private vector and the two-dimensional private vector sent by the central controller and keeps secret; the central controller sends the finite field F, the constant N and the mapping f to the new subgroup controllers;

repeat the steps 2 to 4.

Preferably, said m is 2.

Preferably, suppose that the mapping f is represented by $z=f(w,b)$, wherein w, b, $z \in F$, the main function of the mapping f is randomization, and the mapping f conforms to the following characteristics:

1) it is easy to calculate $z=f(w,b)$ if w and b are known;
2) it is difficult to calculate w if only z and b are known; if only z and w are known, it is also difficult to calculate b from $z=f(w,b)$; it is difficult to calculate w from $z_i=f(w,b_i)$, though a series of $z_i$ and $b_i$ is obtained; and it is also difficult to calculate b from $z_i=f(w_i,b)$ though a series of $z_i$ and $w_i$ are obtained.

Preferably, the hierarchical group key management approach based on linear geometry further comprises auto update: if no group member joins in or leaves the group for a preset period of time, then the group controller will update the group key of each subgroup periodically; the group controller reselects a new private vector for each subgroup and sends the new private vector to the corresponding subgroup controller, the subgroup controller receives the new private vector and keeps secret; the central controller reselects the mapping parameter and the group key of each subgroup, calculates the public matrix, broadcasts or multicasts the public matrix and the mapping parameter to all subgroup controllers by the central controller via open channel.

Compared with the prior art, the present invention has the following advantages:

Firstly, the secure channel is required only when the initialization and auto update of the group. During the initialization of the group, the group has not yet been established, so the secure channel is needed in order to ensure the security of the private vector; the auto update should update the private vectors of the subgroups, thus this can prevent the system security from being affected by the leakage of private vectors; and during the communication after then, the central controller only needs to send the central vector A and the mapping parameter r to all the group members, and because the vector A and r are both public, it is not necessary to keep secret, the secure channel is not required, and hence the open channel can be used for broadcasting and multicasting.

Secondly, the method of the present invention is independent of other cryptography methods. The security of the present invention is based on the linear geometry theory over the finite field, only simple mapping function and basic operation over the finite field is used during the process of calculating the group key, and it does not rely on other traditional cryptography methods including asymmetric cryptography, symmetric cryptography, and hash function. In this way, the possibility that the present invention is attacked by other aspects is reduced. Even if the traditional cryptography methods are broken, the security provided by the present invention will not be affected.

Thirdly, the storage and the computation cost of each member and the group controller are reduced. The subgroup controller $SC_i$ only has to store the private vector $Z_i$ of this subgroup, while the computation amount of each subgroup controller $SC_i$ is the amount of calculating the group key and the confidential vector $X_i$ in step 7.

Fourthly, the computation of the group controller can be easily parallelized. For the central controller or subgroup controller, if the group controller operates on a multi-core processor platform, then it is very easy to enable the computation of the group controller to be parallel by using the current popular parallel computing library, which takes the advantage of the multi-core processor.

Fifthly, the subgroup does not have to know and store the hierarchical structure of the group, the computation result will reveal whether a subgroup is a descendant subgroup. Meanwhile, the hierachical structure of the entire group is hidden. Though the ancestor subgroup knows whether a subgroup is its descendant subgroup, it can not know its path to the descendant subgroup. This will be useful to improve the security of the system.

The present invention can provide sufficient security, and the specific security is analysized as follows:

Firstly, forward and backward secrecy is provided. The group key $k_i$ is randomly selected, and $k_i$ will be changed each time the group members join or leave. The group key $k_i$ will be updated periodically, and the key will be different at different period of time. Therefore, the security is improved, and the forward and backward secrecy can be guaranteed.

Secondly, the approach provides the security guaranty among different levels: a higher level node can derive the keys of its direct or indirect descendant nodes (at lower level), but not vice versa. The mapping parameter and the public matrix A are public, and the higher level node can calculate the keys of its descendant nodes, but the descendant node can not know the private vector $Z_i$ of its parent node, and therefore $X_i$ can not be calculated, and the key $k_i$ of its parent node can not be calculated either. Thus, this approach can guarantee the security among different levels.

Thirdly, the subgroups without direct nor indirect ancestor-descendant relationship can not know the subgroup key of each other. The subgroups without direct nor indirect ancestor-descendant relationship can not calculate the confidential vector $X_i$ of one another. Establish equations about $X_i$, but since there are at most n number of equations and at least n+1 number of unknown quantity (the key $k_i$ of the subgroup $V_i$ is only known by $V_i$ and its parent group nodes), the subgroups without direct nor indirect ancestor-descendant relationship can not calculate the key of one another.

Fourthly, members outside the group can not calculate $k_i$. In this approach, A and r are sent via a public channel, and members outside the group can not calculate any $k_i$ based on A and r.

DETAILED DESCRIPTION OF THE PREFERRED EMBODIMENTS

The invention will be further described in detail in the following embodiments accompanying the drawings. It will nevertheless be understood that no limitation of the scope of the invention is thereby intended.

Embodiment 1

Figure 1:
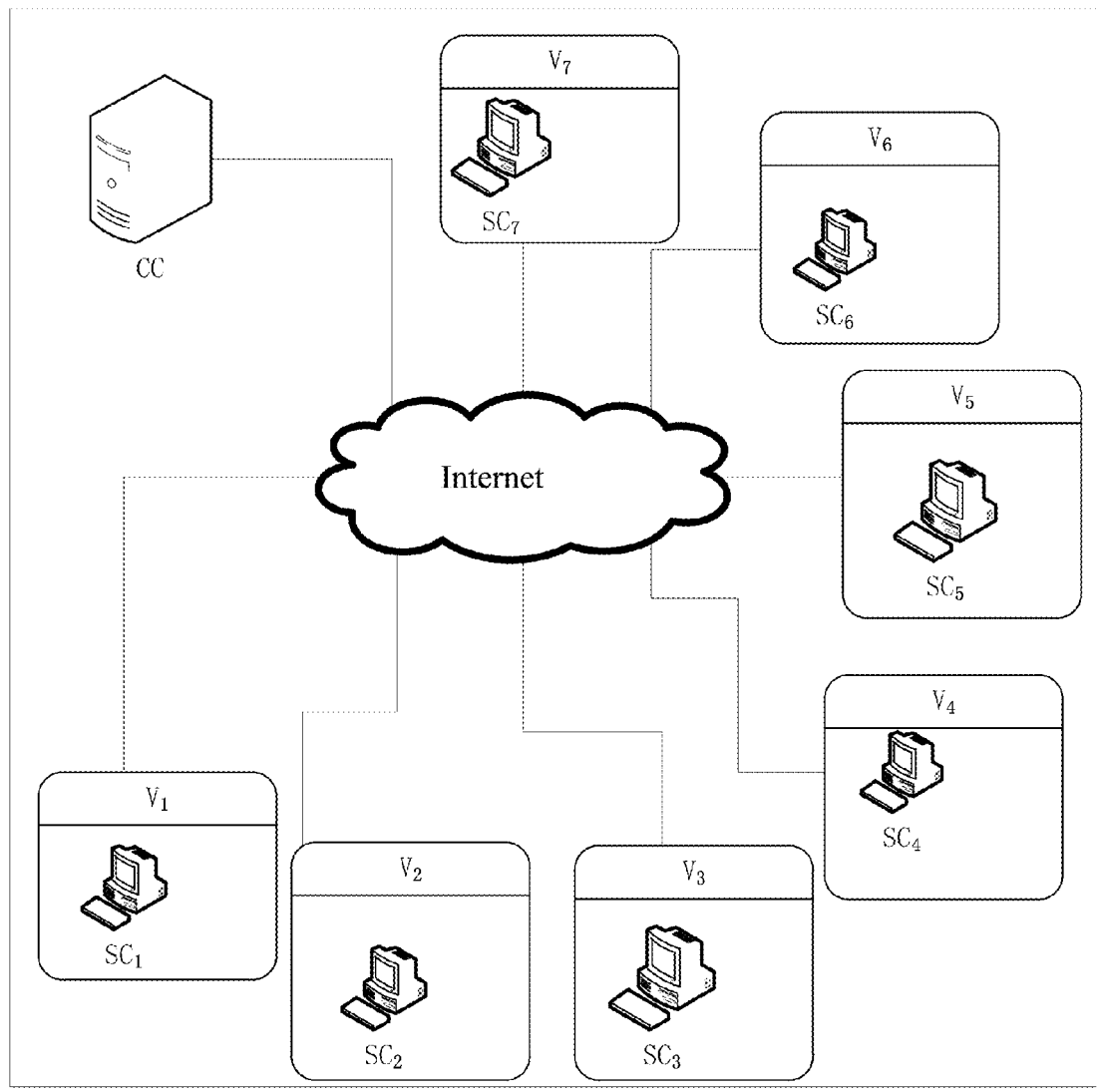
FIG. 1 is a schematic diagram of an architecture of group communication system with hierarchical access control according to a first embodiment of the invention.

Referring to FIG. 1, a group communication system with hierarchical access control includes a central controller CC, subgroups $V_i$, subgroup controllers $SC_i$, and the central controller CC and the subgroups $V_i$ are connected via internet, wherein i=1, 2, . . . , 7.

Figure 2:
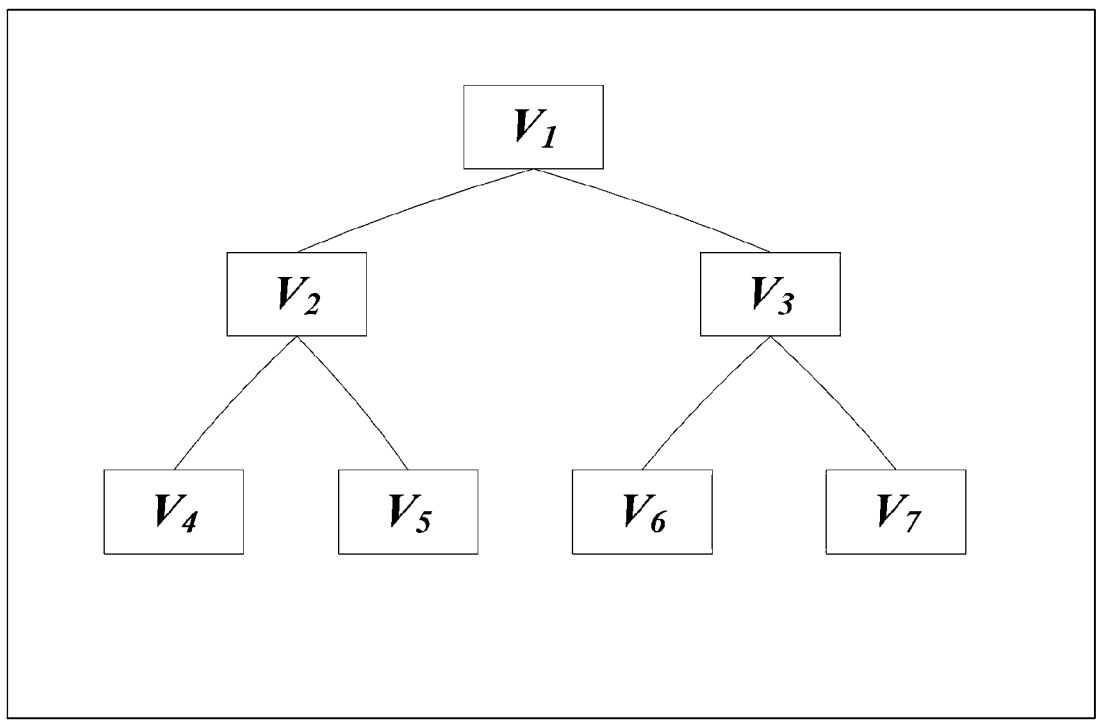
FIG. 2 is a schematic diagram of a hierarchical access structure of a group according to the first embodiment of the invention.

The group hierarchical access structure is shown in FIG. 2. All the higher level nodes can derive the keys of its direct or indirect descendant nodes, while the lower level nodes can not derive the keys of its ancestor nodes. The nodes without direct nor indirect ancestor-descendant relationship can not know the subgroup key of each other. The key of one node can not be derived by the other node if they are brother nodes.

Figure 3:
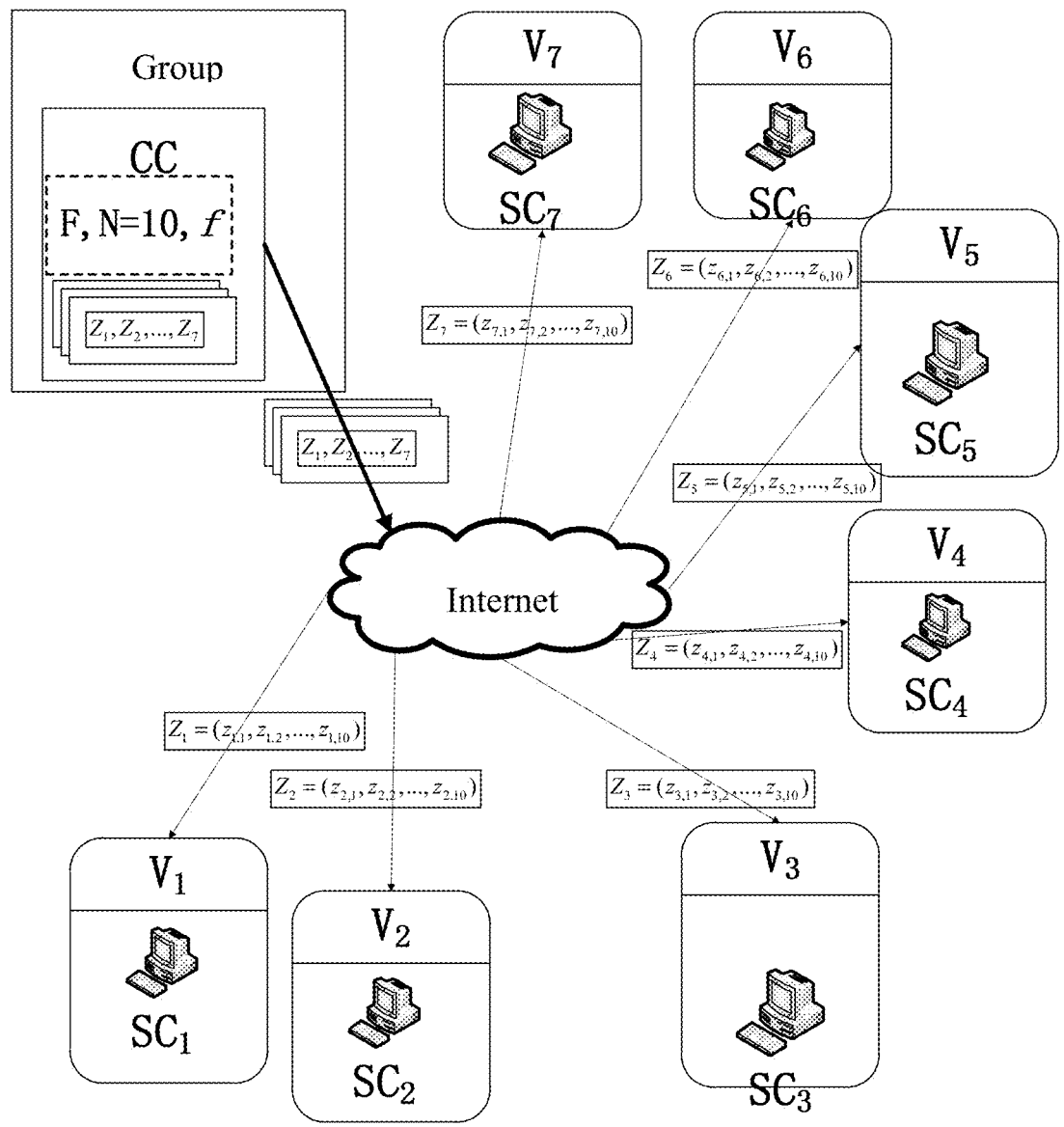
FIG. 3 is a schematic diagram of the communication process during the initialization of the group according to the first embodiment of the invention.

As shown in FIG. 3, the system selects the finite field F, and all computations in the group are performed over the finite field F; meanwhile, a pseudo-random number generator is selected to be used as $f(.,.)$; for the same initialization input (seed), the pseudo-random number generator should have the same output sequence; at initialization, let N=10.

Step 1: when the subgroup $V_i$ would like to join in the group, the central controller CC selects a private vector $Z_i=(z_{i,1}, z_{i,2}, \ldots, z_{i,10})$ ($z_{i,j} \in F$, j=1, . . . , 10) randomly for each subgroup V; sends the private vector to the corresponding subgroup controller via secure channel, and the subgroup controller stores the private vector and keeps secret; CC assigns a serial number $SC_i$ for the subgroup controller of the subgroup $V_i$, and the serial number is broadcasted or multicasted to all the subgroup controllers via public channel, wherein i=1, 2, . . . , 7;

Step 2: the central controller CC selects a random number r in the finite field F to be used as the mapping parameter, and maps all the private vectors $Z_i$ into a new set of vectors $X_i=(x_{i,1}, x_{i,2}, \ldots, x_{i,7})$ via the mapping $f(\bullet,\bullet)$, wherein i=1, 2, . . . , 7:

$$x_{1,1} = f(z_{1,1}, r)$$
$$x_{1,2} = f(z_{1,2}, r)$$
$$\ldots,$$
$$x_{1,7} = f(z_{1,7}, r)$$
$$\ldots,$$
$$x_{7,1} = f(z_{7,1}, r)$$
$$x_{7,2} = f(z_{7,2}, r)$$
$$\ldots,$$
$$x_{7,7} = f(z_{7,7}, r)$$

then CC obtains a new set of vectors over the finite field F, called confidential vectors:

$$X_1 = (x_{1,1}, x_{1,2}, \ldots, x_{1,7})$$
$$X_2 = (x_{2,1}, x_{2,2}, \ldots, x_{2,7})$$
$$\ldots,$$
$$X_7 = (x_{7,1}, x_{7,2}, \ldots, x_{7,7})$$

The central controller CC judges whether $X_1, X_2, \ldots, X_7$ are linearly dependent, and if they are linearly independent, then proceed to the step 3; otherwise, return to the step 2. (Since r is a random number, it is easy to obtain a set of vectors $X_1, X_2, \ldots, X_7$ that are linearly independent).

Step 3: suppose the public vector is $A_i=(a_{i,1}, a_{i,2}, \ldots, a_{i,7})$; CC selects a key randomly in the finite field F for each subgroup controller $SC_i$, respectively, $k_1, k_2, \ldots, k_7$, and $k_i \neq 0$ (i=1, 2, . . . , 7); CC calculates the public matrix A from the following systems of equations, wherein i=1, 2, . . . , 7:

(1) for $V_1$, only $V_1$ can derive $k_1$, and the other $V_i$ (i=2, 3, . . . , 7) can not derive $k_1$. The relationship of each $X_i$ (i=1, 2, . . . , 7), the public vector $A_1$ and the key $k_1$ is as follows:

$$X_1 \times A_1^T = k_1$$
$$X_2 \times A_1^T = 0$$
$$X_3 \times A_1^T = 0$$
$$X_4 \times A_1^T = 0$$
$$X_5 \times A_1^T = 0$$
$$X_6 \times A_1^T = 0$$
$$X_7 \times A_1^T = 0$$

Suppose $X=(X_1, X_2, \ldots, X_7)$, $K_1=(k_1, 0, 0, 0, 0, 0, 0)^T$, then it can be written in matrix form as: $X \times A_1^T = K_1$, while it can also be represented by a system of equations as follows:

$$\begin{cases} x_{1,1}a_{1,1} + x_{1,2}a_{1,2} + \ldots + x_{1,7}a_{1,7} = k_1 \\ x_{2,1}a_{1,1} + x_{2,2}a_{1,2} + \ldots + x_{2,7}a_{1,7} = 0 \\ x_{3,1}a_{1,1} + x_{3,2}a_{1,2} + \ldots + x_{3,7}a_{1,7} = 0 \\ x_{4,1}a_{1,1} + x_{4,2}a_{1,2} + \ldots + x_{4,7}a_{1,7} = 0 \\ x_{5,1}a_{1,1} + x_{5,2}a_{1,2} + \ldots + x_{5,7}a_{1,7} = 0 \\ x_{6,1}a_{1,1} + x_{6,2}a_{1,2} + \ldots + x_{6,7}a_{1,7} = 0 \\ x_{7,1}a_{1,1} + x_{7,2}a_{1,2} + \ldots + x_{7,7}a_{1,7} = 0 \end{cases}$$

(2) for $V_2$, both $V_1$ and $V_2$ can derive $k_2$, the other $V_i$($i=3, 4, \ldots, 7$) can not derive $k_2$. The relationship of each $X_i$ ($i=1, 2, \ldots, 7$), the public vector $A_2$ and key $k_2$ is as follows:

$X_1 \times A_2^T = k_2$ $X_2 \times A_2^T = k_2$ $X_3 \times A_2^T = 0$ $X_4 \times A_2^T = 0$ $X_5 \times A_2^T = 0$ $X_6 \times A_2^T = 0$ $X_7 \times A_2^T = 0$ Suppose $K_2 = (k_2, k_2, 0, 0, 0, 0, 0)^T$, then it can be written in matrix form as: $X \times A_2^T = K_2$; while it can also be represented by a system of equations as follows:

$$\begin{cases} x_{1,1}a_{2,1} + x_{1,2}a_{2,2} + \ldots + x_{1,7}a_{2,7} = k_2 \\ x_{2,1}a_{2,1} + x_{2,2}a_{2,2} + \ldots + x_{2,7}a_{2,7} = k_2 \\ x_{3,1}a_{2,1} + x_{3,2}a_{2,2} + \ldots + x_{3,7}a_{2,7} = 0 \\ x_{4,1}a_{2,1} + x_{4,2}a_{2,2} + \ldots + x_{4,7}a_{2,7} = 0 \\ x_{5,1}a_{2,1} + x_{5,2}a_{2,2} + \ldots + x_{5,7}a_{2,7} = 0 \\ x_{6,1}a_{2,1} + x_{6,2}a_{2,2} + \ldots + x_{6,7}a_{2,7} = 0 \\ x_{7,1}a_{2,1} + x_{7,2}a_{2,2} + \ldots + x_{7,7}a_{2,7} = 0 \end{cases}$$

(3) for $V_3$, only $V_1$ and $V_3$ can derive $k_3$, but other $V_i$($i=2, 4, 5, 6, 7$) can not derive $k_3$. The relationship of each confidential vector $X_i$ ($i=1, 2, \ldots, 7$), the public vector $A_3$ and the key $k_3$ is as follows:

$X_1 \times A_3^T = k_3$ $X_2 \times A_3^T = 0$ $X_3 \times A_3^T = k_3$ $X_4 \times A_3^T = 0$ $X_5 \times A_3^T = 0$ $X_6 \times A_3^T = 0$ $X_7 \times A_3^T = 0$ Suppose $K_3 = (k_3, 0, k_3, 0, 0, 0, 0)^T$, then it can be written in matrix form as: $X \times A_3^T = K_3$; while it can also be represented by a system of equations as follows:

$$\begin{cases} x_{1,1}a_{3,1} + x_{1,2}a_{3,2} + \ldots + x_{1,7}a_{3,7} = k_3 \\ x_{2,1}a_{3,1} + x_{2,2}a_{3,2} + \ldots + x_{2,7}a_{3,7} = 0 \\ x_{3,1}a_{3,1} + x_{3,2}a_{3,2} + \ldots + x_{3,7}a_{3,7} = k_3 \\ x_{4,1}a_{3,1} + x_{4,2}a_{3,2} + \ldots + x_{4,7}a_{3,7} = 0 \\ x_{5,1}a_{3,1} + x_{5,2}a_{3,2} + \ldots + x_{5,7}a_{3,7} = 0 \\ x_{6,1}a_{3,1} + x_{6,2}a_{3,2} + \ldots + x_{6,7}a_{3,7} = 0 \\ x_{7,1}a_{3,1} + x_{7,2}a_{3,2} + \ldots + x_{7,7}a_{3,7} = 0 \end{cases}$$

(4) for $V_4$, the key $k_4$ can be derived by $V_1$, $V_2$ and $V_4$, but can not be derived by the other $V_i$($i=3, 5, 6, 7$). The confidential vector $X_i$($i=1, 2, \ldots, 7$), the public vector $A_4$ and the key $k_4$ have the following relationship:

$X_1 \times A_4^T = k_4$ $X_2 \times A_4^T = k_4$ $X_3 \times A_4^T = 0$ $X_4 \times A_4^T = k_4$ $X_5 \times A_4^T = 0$ $X_6 \times A_4^T = 0$ $X_7 \times A_4^T = 0$ Suppose $K_4 = (k_4, k_4, 0, k_4, 0, 0, 0)^T$, then it can be written in matrix form as: $X \times A_4^T = K_4$; while it can also be represented by a system of equations as follows:

$$\begin{cases} x_{1,1}a_{4,1} + x_{1,2}a_{4,2} + \ldots + x_{1,7}a_{4,7} = k_4 \\ x_{2,1}a_{4,1} + x_{2,2}a_{4,2} + \ldots + x_{2,7}a_{4,7} = k_4 \\ x_{3,1}a_{4,1} + x_{3,2}a_{4,2} + \ldots + x_{3,7}a_{4,7} = 0 \\ x_{4,1}a_{4,1} + x_{4,2}a_{4,2} + \ldots + x_{4,7}a_{4,7} = k_4 \\ x_{5,1}a_{4,1} + x_{5,2}a_{4,2} + \ldots + x_{5,7}a_{4,7} = 0 \\ x_{6,1}a_{4,1} + x_{6,2}a_{4,2} + \ldots + x_{6,7}a_{4,7} = 0 \\ x_{7,1}a_{4,1} + x_{7,2}a_{4,2} + \ldots + x_{7,7}a_{4,7} = 0 \end{cases}$$

(5) for $V_5$, the key $k_5$ can be derived by $V_1$, $V_2$ and $V_5$, but can not be derived by other $V_i$($i=3, 4, 6, 7$). The confidential vector $X_i$ ($i=1, 2, \ldots, 7$), the public vector $A_5$ and the key $k_5$ have the following relationship:

$X_1 \times A_5^T = k_5$ $X_2 \times A_5^T = k_5$ $X_3 \times A_5^T = 0$ $X_4 \times A_5^T = 0$ $X_5 \times A_5^T = k_5$ $X_6 \times A_5^T = 0$ $X_7 \times A_5^T = 0$ Suppose $K_5 = (k_5, k_5, 0, k_5, 0, 0, 0)^T$, then it can be written in matrix form as: $X \times A_5^T = K_5$; while it can also be represented by a system of equations as follows:

$$\begin{cases} x_{1,1}a_{5,1} + x_{1,2}a_{5,2} + \ldots + x_{1,7}a_{5,7} = k_5 \\ x_{2,1}a_{5,1} + x_{2,2}a_{5,2} + \ldots + x_{2,7}a_{5,7} = k_5 \\ x_{3,1}a_{5,1} + x_{3,2}a_{5,2} + \ldots + x_{3,7}a_{5,7} = 0 \\ x_{4,1}a_{5,1} + x_{4,2}a_{5,2} + \ldots + x_{4,7}a_{5,7} = 0 \\ x_{5,1}a_{5,1} + x_{5,2}a_{5,2} + \ldots + x_{5,7}a_{5,7} = k_5 \\ x_{6,1}a_{5,1} + x_{6,2}a_{5,2} + \ldots + x_{6,7}a_{5,7} = 0 \\ x_{7,1}a_{5,1} + x_{7,2}a_{5,2} + \ldots + x_{7,7}a_{5,7} = 0 \end{cases}$$

(6) for $V_6$, the key $k_6$ can be derived by $V_1$, $V_3$ and $V_6$, but can not be derived by other $V_i$ (i=2, 4, 5, 7). The confidential vector $X_i$ (i=1, 2, ..., 7), the public vector $A_6$ and the key $k_6$ have the following relationship:

$X_1 \times A_6^T = k_6$ $X_2 \times A_6^T = 0$ $X_3 \times A_6^T = k_6$ $X_4 \times A_6^T = 0$ $X_5 \times A_6^T = 0$ $X_6 \times A_6^T = k_6$ $X_7 \times A_6^T = 0$ Suppose $K_6 = (k_6, 0, k_6, 0, 0, k_6, 0)$, then it can be written in matrix form as: $X \times A_6^T = K_6$; while it can also be represented by a system of equations as follows:

$$\begin{cases} x_{1,1}a_{6,1} + x_{1,2}a_{6,2} + \ldots + x_{1,7}a_{6,7} = k_6 \\ x_{2,1}a_{6,1} + x_{2,2}a_{6,2} + \ldots + x_{2,7}a_{6,7} = 0 \\ x_{3,1}a_{6,1} + x_{3,2}a_{6,2} + \ldots + x_{3,7}a_{6,7} = k_6 \\ x_{4,1}a_{6,1} + x_{4,2}a_{6,2} + \ldots + x_{4,7}a_{6,7} = 0 \\ x_{5,1}a_{6,1} + x_{5,2}a_{6,2} + \ldots + x_{5,7}a_{6,7} = 0 \\ x_{6,1}a_{6,1} + x_{6,2}a_{6,2} + \ldots + x_{6,7}a_{6,7} = k_6 \\ x_{7,1}a_{6,1} + x_{7,2}a_{6,2} + \ldots + x_{7,7}a_{6,7} = 0 \end{cases}$$

(7) for $V_7$, the key $k_7$ can be derived by $V_1$, $V_3$ and $V_7$, but can not be derived by other $V_i$ (i=2, 4, 5, 6). The confidential vector $X_i$ (i=1, 2, ..., 7), the public vector $A_7$ and the key $k_7$ have the following relationship:

$X_1 \times A_7^T = k_7$ $X_2 \times A_7^T = 0$ $X_3 \times A_7^T = 0$ $X_4 \times A_7^T = 0$ $X_5 \times A_7^T = 0$ $X_6 \times A_7^T = 0$ $X_7 \times A_7^T = k_7$ Suppose $K_7 = (k_7, 0, k_7, 0, 0, k_7)^T$, then it can be written in matrix form as: $X \times A_7^T = K_7$; while it can also be represented by a system of equations as follows:

$$\begin{cases} x_{1,1}a_{7,1} + x_{1,2}a_{7,2} + \ldots + x_{1,7}a_{7,7} = k_7 \\ x_{2,1}a_{7,1} + x_{2,2}a_{7,2} + \ldots + x_{2,7}a_{7,7} = 0 \\ x_{3,1}a_{7,1} + x_{3,2}a_{7,2} + \ldots + x_{3,7}a_{7,7} = k_7 \\ x_{4,1}a_{7,1} + x_{4,2}a_{7,2} + \ldots + x_{4,7}a_{7,7} = 0 \\ x_{5,1}a_{7,1} + x_{5,2}a_{7,2} + \ldots + x_{5,7}a_{7,7} = 0 \\ x_{6,1}a_{7,1} + x_{6,2}a_{7,2} + \ldots + x_{6,7}a_{7,7} = 0 \\ x_{7,1}a_{7,1} + x_{7,2}a_{7,2} + \ldots + x_{7,7}a_{7,7} = k_7 \end{cases}$$

(8) Let $A = (A_1^T, A_2^T, \ldots, A_7^T)$; $K = (K_1, K_2, \ldots, K_7)$ from the above (1) to (7), it can be obtained that $X \times A = K$, that is, $$\begin{bmatrix} x_{11} & x_{12} & x_{13} & x_{14} & x_{15} & x_{16} & x_{17} \\ x_{21} & x_{22} & x_{23} & x_{24} & x_{25} & x_{26} & x_{27} \\ x_{31} & x_{32} & x_{33} & x_{34} & x_{35} & x_{36} & x_{37} \\ x_{41} & x_{42} & x_{43} & x_{44} & x_{45} & x_{46} & x_{47} \\ x_{51} & x_{52} & x_{53} & x_{54} & x_{55} & x_{56} & x_{57} \\ x_{61} & x_{62} & x_{63} & x_{64} & x_{65} & x_{66} & x_{67} \\ x_{71} & x_{72} & x_{73} & x_{74} & x_{75} & x_{76} & x_{77} \end{bmatrix} \times$$

$$\begin{bmatrix} a_{11} & a_{21} & a_{31} & a_{41} & a_{51} & a_{61} & a_{71} \\ a_{12} & a_{22} & a_{32} & a_{42} & a_{52} & a_{62} & a_{72} \\ a_{13} & a_{23} & a_{33} & a_{43} & a_{53} & a_{63} & a_{73} \\ a_{14} & a_{24} & a_{34} & a_{44} & a_{54} & a_{64} & a_{74} \\ a_{15} & a_{25} & a_{35} & a_{45} & a_{55} & a_{65} & a_{75} \\ a_{16} & a_{26} & a_{36} & a_{46} & a_{56} & a_{66} & a_{76} \\ a_{17} & a_{27} & a_{37} & a_{47} & a_{57} & a_{67} & a_{77} \end{bmatrix} = \begin{bmatrix} k_1 & k_2 & k_3 & k_4 & k_5 & k_6 & k_7 \\ 0 & k_2 & 0 & k_4 & k_5 & 0 & 0 \\ 0 & 0 & k_3 & 0 & 0 & k_6 & k_7 \\ 0 & 0 & 0 & k_4 & 0 & 0 & 0 \\ 0 & 0 & 0 & 0 & k_5 & 0 & 0 \\ 0 & 0 & 0 & 0 & 0 & k_6 & 0 \\ 0 & 0 & 0 & 0 & 0 & 0 & k_7 \end{bmatrix}$$

As long as the matrix determinant $$|X| = \begin{vmatrix} x_{11} & x_{12} & \ldots & x_{17} \\ x_{21} & x_{22} & \ldots & x_{27} \\ \vdots & \vdots & \ddots & \vdots \\ x_{71} & x_{72} & \ldots & x_{77} \end{vmatrix} \neq 0,$$

then A has a unique solution.

The matrix A calculated and the mapping parameter are broadcasted or multicasted by CC to all the subgroup controllers $SC_i$ via public channel, wherein i=1, 2, ..., 7;

Step 4: after all the subgroup controllers receive the public matrix A and the mapping parameter r, the new vector is calculated through $f(\cdot, \cdot)$ and the mapping parameter r:

For the subgroup controller $SC_i$, wherein $X_i = (X_{i,1}, X_{i,2}, \ldots, X_{i,7})$:

$x_{i,1} = f(z_{i,1}, r)$ $x_{i,2} = f(z_{i,2}, r)$ $\ldots$, $x_{i,7} = f(z_{i,7}, r)$ Then, $k_i$ and $t_j$ ($j \neq i$ and $j=1, \ldots, 7$) are calculated according to the equations (4) and (5), wherein i=1, 2, ..., 7;

For example, for $V_3$, the subgroup controller $SC_3$ receives the matrix A and the parameter r, and calculates $X_3$ ($X_{3,1}$, $X_{3,2}, \ldots, X_{3,7}$):

$$x_{3,1} = f(z_{3,1}, r)$$

$$x_{3,2} = f(z_{3,2}, r)$$

$$\ldots,$$

$$x_{3,7} = f(z_{3,7}, r)$$

Then, according to the equations (4) and (5), $SC_3$ calculates $k_3$ and $t_j$ (j=1, 2, 4, 5, 6, 7), Wherein $t_6$=$k_6$, $t_7$=$k_7$, and the other $t_j$=0 (j=1, 2, 4, 5); the subgroup controller $SC_3$ distributes the calculated $k_3$ and $t_j$ (j=1, 2, 4, 5, 6, 7) to subgroup members through the group key management scheme in the subgroup.

Figure 4:
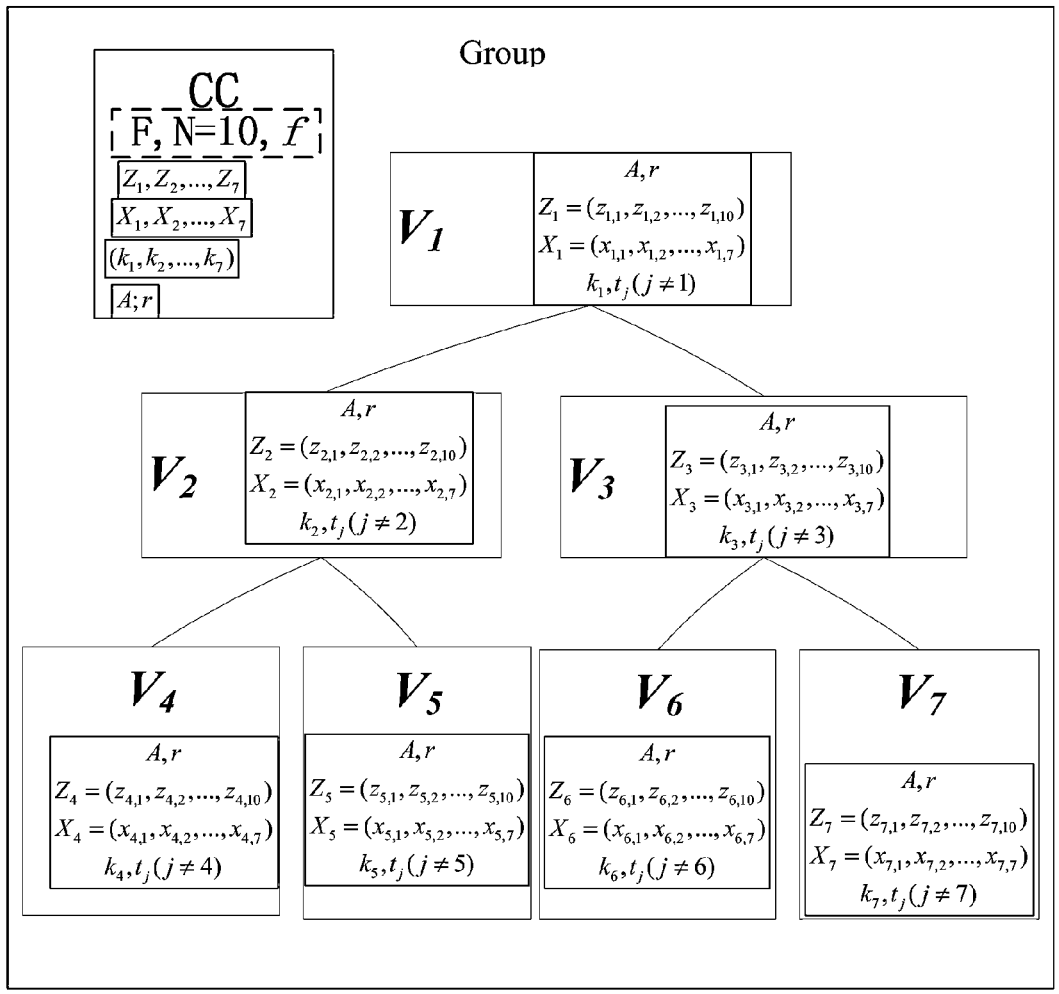
FIG. 4 is a schematic diagram showing the variables and the relationship of CC and $SC_i$ after the group is established according to the first embodiment of the invention.

As shown in FIG. 4, a group with hierarchical access control and seven subgroups is established according to the above steps. The hierarchical relationship among subgroups is contained in the confidential vector of each subgroup and the public matrix A.

Embodiment 2

Figure 5:
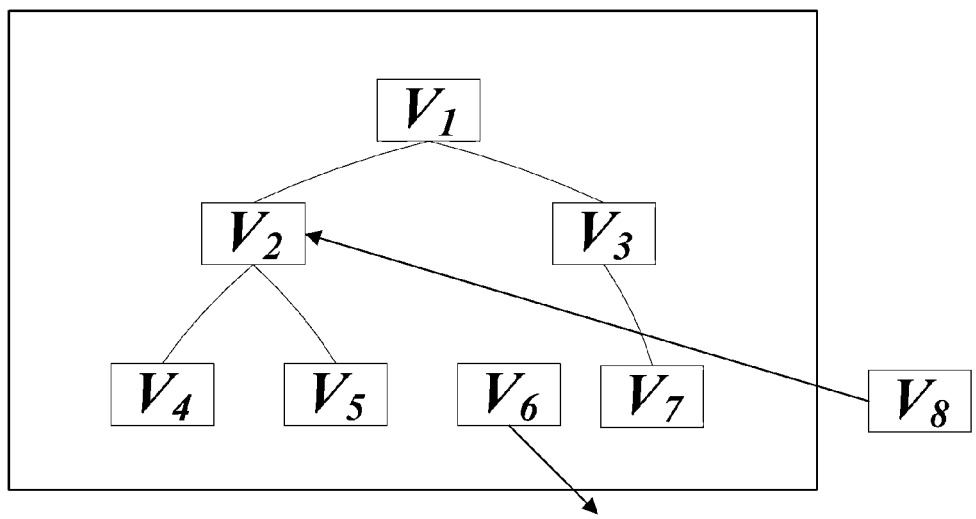
FIG. 5 is a schematic diagram showing that subgroups join in and leave the group simultaneously according to a second embodiment of the invention.

When the relationship between the subgroups is changed, as shown in FIG. 5: $V_6$ wants to leave the group while $V_8$ wants to join in the group as a new subgroup of $V_2$.

Figure 6:
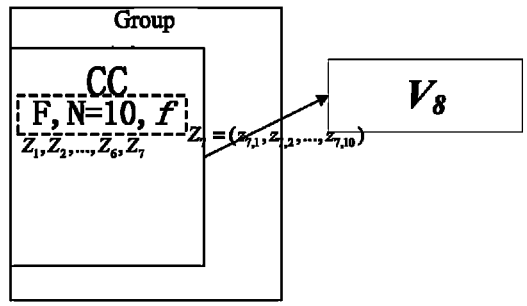
FIG. 6 is a schematic diagram showing the communication between CC and a new joining subgroup $SC_i$ according to the second embodiment of the invention.
Figure 7:
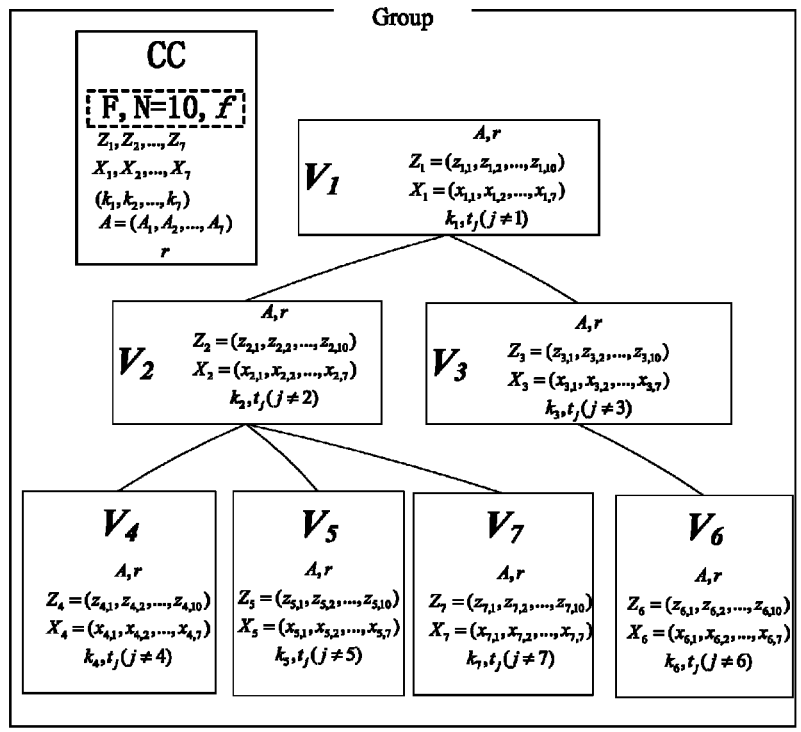
FIG. 7 is a schematic diagram showing that a new group is established after the group has finished all the operations regarding the joining and leaving of subgroups according to the second embodiment of the invention.

Step 1, as show in FIG. 6, $SC_6$ sends a leaving request to CC, and CC deletes the private vector $Z_6$ after receiving the request; CC selects a private vector $Z \in F^N$ randomly, and sends it to the subgroup controller of $V_8$ via secure channel; after receiving the private vector Z, the subgroup controller of $V_8$ stores it and keeps secret;

CC reassigns serial numbers for the current subgroup controllers, wherein $SC_1$ to $SC_5$ remain unchanged, and the corresponding private vectors are $Z_1$ to $Z_5$ respectively; $SC_7$ is changed into $SC_6$, while the corresponding private vector is changed into $Z_6$; the serial number of $V_8$ is changed into $SC_7$ while its corresponding private vector is changed into $Z_7$ correspondingly. At this time, the private vector stored by CC is $Z_i$ (i=1, 2, ..., 7), and the hierarchical relationship of the group is shown in FIG. 7.

The other steps are identical to the steps 2 to 4 of Embodiment 1. It should be noted that: for $SC_7$, the relationship of each private vector $X_i$ (i=1, 2, ..., 7), the public vector $A_7$ and the subgroup key $k_7$ is different from the item (7) of the step 3 of Embodiment 1, and the corresponding relationship after $SC_7$ is changed is as follows:

For $SC_7$, $V_3$ can no longer derive $k_7$, and $k_7$ can be derived by $V_1$, $V_2$ and $V_7$, but can not be derived by the other $V_i$ (i=4, 5, 6). Each private vector $X_i$ (i=1, 2, ..., 7), the public vector $A_7$ and the key $k_7$ have the following relationship:

$$X_1 \times A_7^T = k_7$$

$$X_2 \times A_7^T = k_7$$

$$X_3 \times A_7^T = 0$$

$$X_4 \times A_7^T = 0$$

$$X_5 \times A_7^T = 0$$

$$X_6 \times A_7^T = 0$$

$$X_7 \times A_7^T = k_7$$

Suppose $K_7 = (k_7, k_7, 0, 0, 0, 0, k_7)^T$, then it can be written in matrix form: $X \times A_7^T = K_7$; while it can also be represented by a system of equations as follows:

$$\begin{cases} x_{1,1}a_{7,1} + x_{1,2}a_{7,2} + \ldots + x_{1,7}a_{7,7} = k_7 \\ x_{2,1}a_{7,1} + x_{2,2}a_{7,2} + \ldots + x_{2,7}a_{7,7} = k_7 \\ x_{3,1}a_{7,1} + x_{3,2}a_{7,2} + \ldots + x_{3,7}a_{7,7} = 0 \\ x_{4,1}a_{7,1} + x_{4,2}a_{7,2} + \ldots + x_{4,7}a_{7,7} = 0 \\ x_{5,1}a_{7,1} + x_{5,2}a_{7,2} + \ldots + x_{5,7}a_{7,7} = 0 \\ x_{6,1}a_{7,1} + x_{6,2}a_{7,2} + \ldots + x_{6,7}a_{7,7} = 0 \\ x_{7,1}a_{7,1} + x_{7,2}a_{7,2} + \ldots + x_{7,7}a_{7,7} = k_7 \end{cases}$$

The other details are identical to the step 3 of the Embodiment 1.

As shown in FIG. 7, the bulk operation of joining and leaving of groups is done through the above steps, and the new hierarchical relationship is also reflected in A and each $X_i$ (i=1, 2, ..., 7). Joining or leaving separately can be regarded as a special form of the bulk operation. During the joining operation of new groups, the secure channel only exists when the new group sends the private vector to CC, and the other groups (original groups) do not need to resend the private vectors to CC.

Embodiment 3

Figure 8:
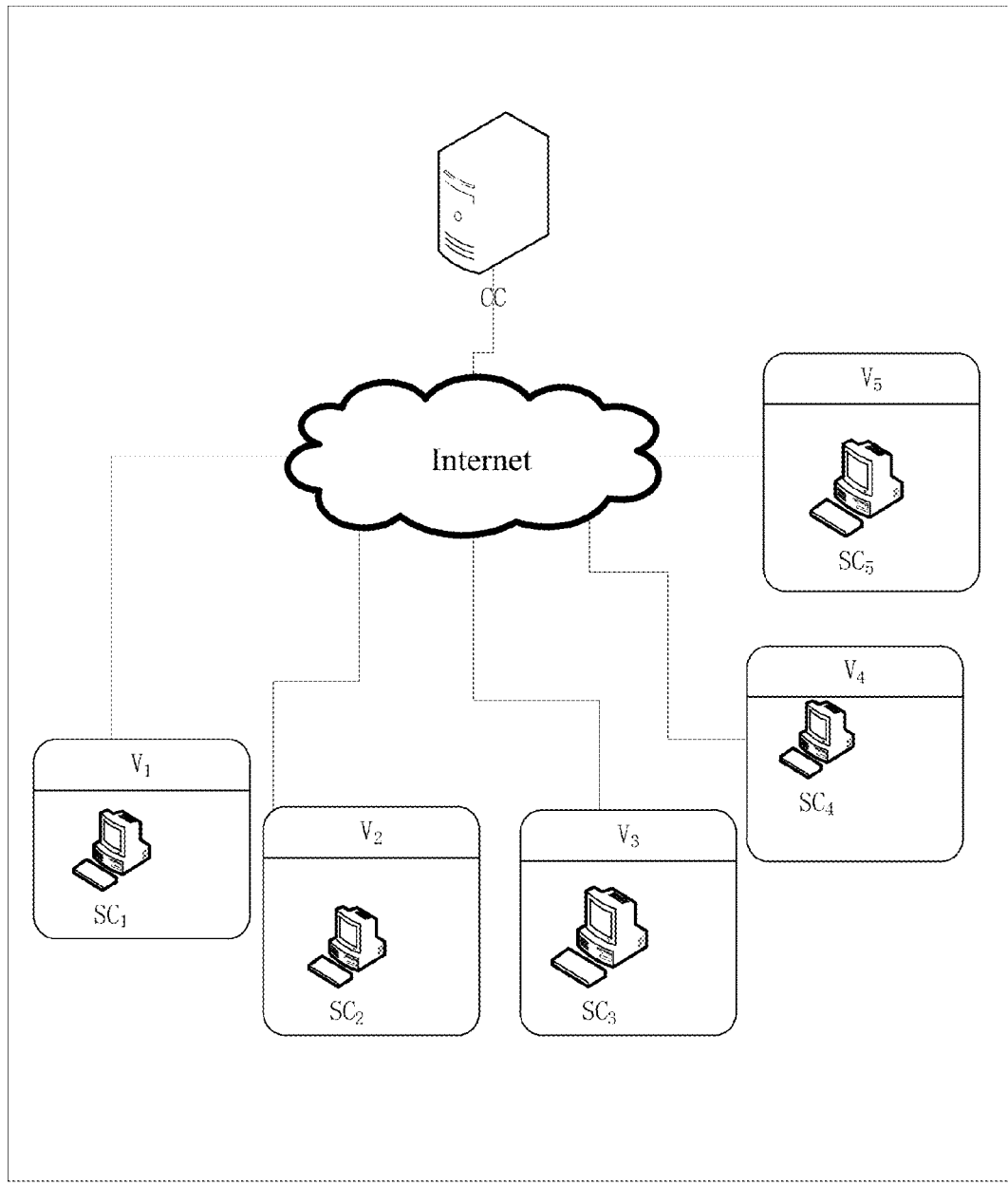
FIG. 8 is a schematic diagram showing an architecture of group communication system with hierarchical access control according to a third embodiment of the invention.

As shown in FIG. 8, a group communication system with hierarchical access control includes a central controller CC, subgroups $V_i$, subgroup controllers $SC_i$, wherein the central controller CC and the subgroup controllers $SC_i$ are connected via internet, wherein i=1, 2, ..., 5.

Figure 9:
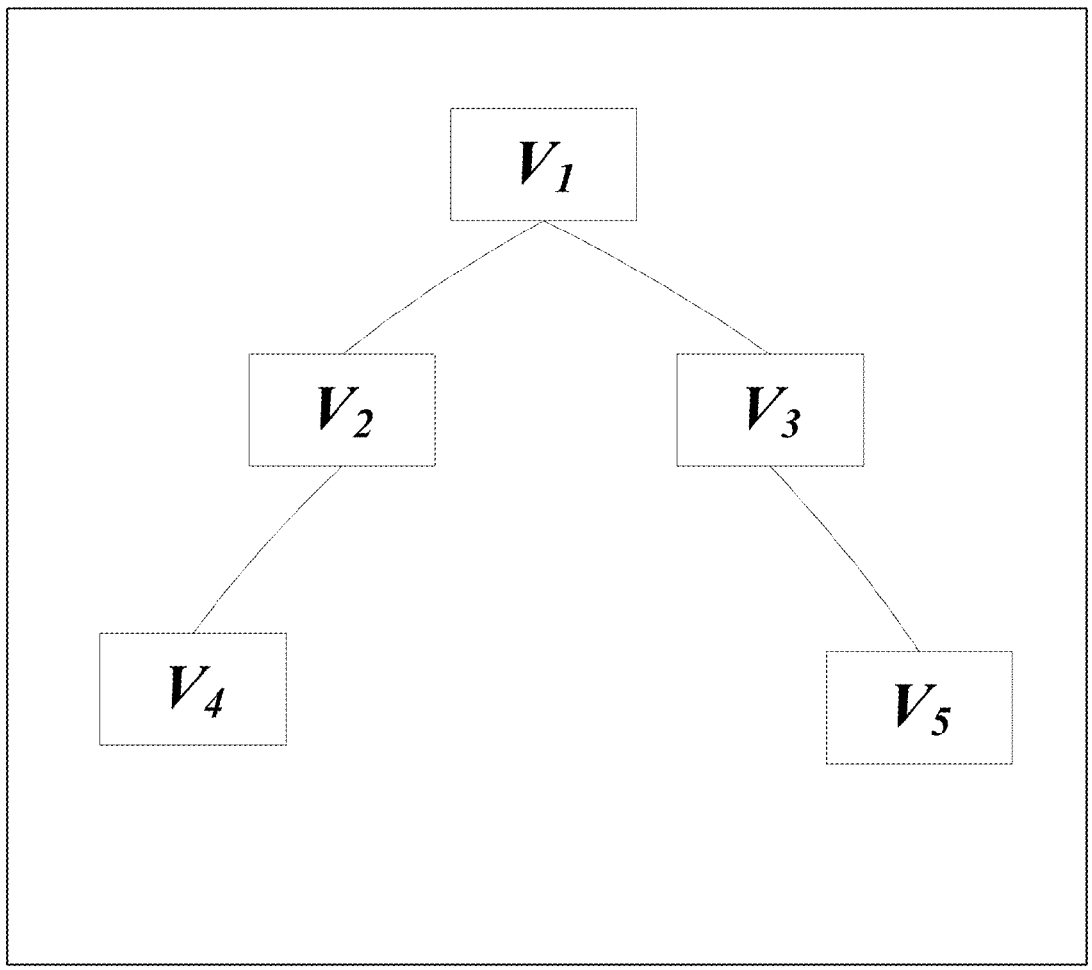
FIG. 9 is a schematic diagram showing a hierachical access structure of the group according to the third embodiment of the invention.

The group hierarchical access structure is shown in FIG. 9. All the higher level nodes can derive the keys of its direct or indirect descendant nodes, while the lower level nodes can not derive the keys of it ancestor nodes. The subgroups without direct nor indirect ancestor-descendant relationship can not know the subgroup key of each other. The key of one node can not be derived by the other node if they are brother nodes.

Figure 10:
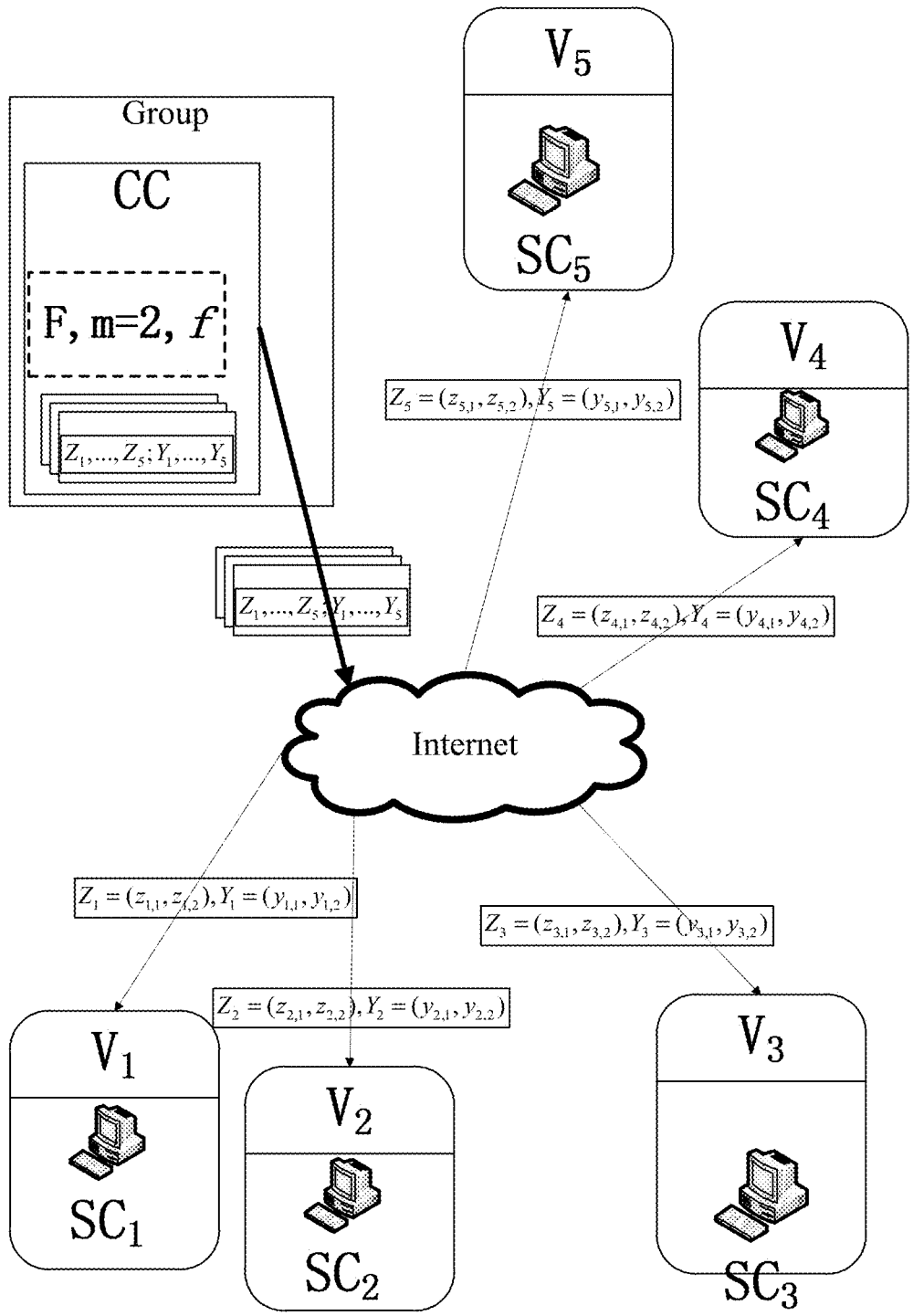
FIG. 10 is a schematic diagram of the communication process during the initialization of the group according to the third embodiment of the invention.

As shown in FIG. 10, the system selects the finite field F, and all computations are performed over the finite field F; meanwhile, a pseudo-random number generator is selected to be used as $f(\bullet,\bullet)$; for the same initialization input (seed), the pseudo-random number generator should have the same output sequence; at initialization, let m=2.

Step 1, when the subgroup $V_i$ wants to join the group, CC selects two private vectors $Z_i = (z_{i,1}, z_{i,2})$ and $Y_i = (y_{i,1}, y_{i,2})$ for each subgroup $V_i$; sends them to the corresponding subgroup controller via secure channel, and all the subgroup controllers receive the private vectors $Z_i$ and $Y_i$, store them and keep secret; a serial number $SC_i$ for the subgroup controller of the subgroup $V_i$ is assigned by CC and broadcasted and multicasted to all the subgroup controllers via public channel, wherein i=1, ..., 5;

Step 2, the central controller CC selects a random number r over the finte field F to be used as the mapping parameter, and maps all the private vectors $Z_i$ and $Y_i$ respectively into new vectors $X_i = (x_{i,1}, \ldots, x_{i,5})$ and $W_i = (w_{i,1}, w_{i,2})$, wherein i=1, 2, ..., 5:

$$x_{1,1} = f(z_{1,1}, r), x_{2,1} = f(z_{2,1}, r), x_{3,1} = f(z_{3,1}, r), x_{4,1} = f(z_{4,1}, r), x_{5,1} = f(z_{5,1}, r)$$

$$x_{1,2} = f(z_{1,2}, r), x_{2,2} = f(z_{2,2}, r), x_{3,3} = f(z_{3,2}, r), x_{4,4} = f(z_{4,2}, r), x_{5,5} = f(z_{5,2}, r);$$

$$w_{1,1} = f(y_{1,1}, r), w_{2,1} = f(y_{2,1}, r), w_{3,1} = f(y_{3,1}, r), w_{4,1} = f(y_{4,1}, r), w_{5,1} = f(y_{5,1}, r)$$

$$w_{1,2} = f(y_{1,2}, r), w_{2,2} = f(y_{2,2}, r), w_{3,2} = f(y_{3,2}, r), w_{4,2} = f(y_{4,2}, r), w_{5,2} = f(y_{5,2}, r)$$

Then, the central controller CC obtains a new set of n-dimensional vectors $X_i$ and a new set of two-dimensional vectors $W_i$, wherein i=1, . . . , 5, and $X_i$ and $W_i$ are called confidential vectors:

$$X_1=(x_{1,1},x_{1,2},0,0,0)$$

$$X_2=(x_{2,1},x_{2,2},0,0,0)$$

$$X_3=(x_{3,1},0,x_{3,3},0,0)$$

$$X_4=(x_{4,1},0,0,x_{4,4},0)$$

$$X_5=(x_{5,1},0,0,0,x_{5,5})$$

$$W_1=(w_{1,1},w_{1,2})$$

$$W_2=(w_{2,1},w_{2,2})$$

$$W_3=(w_{3,1},w_{3,2})$$

$$W_4=(w_{4,1},w_{4,2})$$

$$W_5=(w_{5,1},w_{5,2})$$

The central controller CC judges whether $X_1, X_2, \ldots, X_5$ are linearly dependent, and if they are linearly independent, then proceed to the step 3; or else, return to step 2; (because r is a random number, it is very easy to obtain a set of vectors $X_1, X_2, \ldots, X_5$ which are linearly independent);

Step 3, suppose the private vector of the subgroup $V_i$ is $A_i=(a_{i,1}, a_{i,2}, \ldots, a_{i,5})$; the central controller CC selects a key randomly in the finite field F for each group controller $SC_i$, respectively, $k_{1,1}, k_{2,2}, \ldots, k_{5,5}$, and $k_i \neq 0$ (i=1, 2, . . . , 5); the central controller CC calculates the public matrix A through a series of systems of equations as follows, wherein i=1, 2, . . . , 5:

(1) for $V_1$, only $V_1$ can derive $k_{1,1}$, and the other $V_i$ (i=2, 3, . . . , 5) can not derive $k_{1,1}$. The relationship of each $X_i$(i=1, 2, . . . , 5), the public vector $A_1$ and the key $k_{1,1}$ is as follows:

$$X_1 \times A_1^T = k_{1,1}$$

$$X_2 \times A_1^T = 0$$

$$X_3 \times A_1^T = 0$$

$$X_4 \times A_1^T = 0$$

$$X_5 \times A_1^T = 0$$

suppose $X=(X_1, X_2, \ldots, X_5)$, $K_1=(k_{1,1}, 0, 0, 0, 0)^T$, then it can be written in matrix form: $X \times A_1^T = K_1$, while it can also be represented by a system of equations as follows:

$$\begin{cases} x_{1,1}a_{1,1} + x_{1,2}a_{1,2} + 0 + 0 + 0 = k_{1,1} \\ x_{2,1}a_{1,1} + x_{2,2}a_{1,2} + 0 + 0 + 0 = 0 \\ x_{3,1}a_{1,1} + 0 + x_{3,3}a_{1,3} + 0 + 0 = 0 \\ x_{4,1}a_{1,1} + 0 + 0 + x_{4,4}a_{1,4} + 0 = 0 \\ x_{5,1}a_{1,1} + 0 + 0 + 0 + x_{5,5}a_{1,5} = 0 \end{cases}$$

(2) for $V_2$, $k_{2,2}$ can be derived by $V_1$ and $V_2$, wherein $V_1$ will derive $k_{2,2}$ via an indirect method, and the other $V_i$(i=3, 4, . . . , 5) can not derive $k_{2,2}$. Each private vector $X_i$(i=1, 2, . . . , 5), the public vector $A_2$ and the key $k_{2,2}$ have the following relationship:

$$X_1 \times A_2^T = k_{1,2}$$

$$X_2 \times A_2^T = k_{2,2}$$

$$X_3 \times A_2^T = 0$$

$$X_4 \times A_2^T = 0$$

$$X_5 \times A_2^T = 0$$

wherein, $k_{1,2}=(k_{2,2}-w_{1,1}k_{1,1})w_{1,2}^{-1}$ suppose $K_2=(k_{1,2}, k_{2,2}, 0, 0, 0)^T$, then it can be written in matrix form as: $X \times A_2^T = K_2$, while it can also be represented by a system of equations as follows:

$$\begin{cases} x_{1,1}a_{2,1} + x_{1,2}a_{2,2} + 0 + 0 + 0 = k_{1,2} \\ x_{2,1}a_{2,1} + x_{2,2}a_{2,2} + 0 + 0 + 0 = k_{2,2} \\ x_{3,1}a_{2,1} + 0 + x_{3,3}a_{2,3} + 0 + 0 = 0 \\ x_{4,1}a_{2,1} + 0 + 0 + x_{4,4}a_{2,4} + 0 = 0 \\ x_{5,1}a_{2,1} + 0 + 0 + 0 + x_{5,5}a_{2,5} = 0 \end{cases}$$

wherein, $k_{1,2}=(k_{2,2}-w_{1,1}k_{1,1})w_{1,2}^{-1}$ (3) for $V_3$, only $V_1$ and $V_3$ can derive $k_{3,3}$, wherein $V_1$ will derive $k_{3,3}$ via an indirect method; the other $V_i$(i=2, 4, 5) can not derive $k_{3,3}$. Each private vector $X_i$ (i=1, 2, . . . , 5), the public vector $A_3$ and the key $k_{3,3}$ have the following relationship:

$$X_1 \times A_3^T = k_{1,3}$$

$$X_2 \times A_3^T = 0$$

$$X_3 \times A_3^T = k_{3,3}$$

$$X_4 \times A_3^T = 0$$

$$X_5 \times A_3^T = 0$$

$$k_{1,3}=(k_{3,3}-w_{1,1}k_{1,1})w_{1,2}^{-1}$$

suppose $K_3=(k_{1,3}, 0, k_{3,3}, 0, 0)^T$, then it can be written in matrix form as: $X \times A_3^T = K_3$; while it can also be represented by a system of equations as follows:

$$\begin{cases} x_{1,1}a_{3,1} + x_{1,2}a_{3,2} + 0 + 0 + 0 = k_{1,3} \\ x_{2,1}a_{3,1} + x_{2,2}a_{3,2} + 0 + 0 + 0 = 0 \\ x_{3,1}a_{3,1} + 0 + x_{3,3}a_{3,3} + 0 + 0 = k_{3,3} \\ x_{4,1}a_{3,1} + 0 + 0 + x_{4,4}a_{3,4} + 0 = 0 \\ x_{5,1}a_{3,1} + 0 + 0 + 0 + x_{5,5}a_{3,5} = 0 \end{cases}$$

$$k_{1,3} = (k_{3,3} - w_{1,1}k_{1,1})w_{1,2}^{-1}$$

(4) for $V_4$, $k_{4,4}$ can be derived by $V_1$, $V_2$ and $V_4$, wherein $V_1$ and $V_2$ will derive $k_{4,4}$ via an indirect method; the other $V_i$(i=3, 5) can not derive $k_{4,4}$. Each confidential vector $X_i$(i=1, 2, . . . , 5), the public vector $A_4$ and the key $k_{4,4}$ have the following relationship:

$$X_1 \times A_4^T = k_{1,4}$$

$$X_2 \times A_4^T = k_{2,4}$$

$$X_3 \times A_4^T = 0$$

$$X_4 \times A_4^T = k_{4,4}$$

$$X_5 \times A_4^T = 0$$

$$k_{1,4}=(k_{4,4}-w_{1,1}k_{1,1})w_{1,2}^{-1}$$

$$k_{2,4}=(k_{4,4}-w_{2,1}k_{2,2})w_{2,2}^{-1}$$

suppose $K_4=(k_{1,4}, k_{2,4}, 0, k_{4,4}, 0, 0, 0)^T$, then it can be written in matrix form as $X \times A_4^T = K_4$; while it can also be represented by a system of equations as follows:

$$\begin{cases} x_{1,1}a_{4,1} + x_{1,2}a_{4,2} + 0 + 0 + 0 = k_{1,4} \\ x_{2,1}a_{4,1} + x_{2,2}a_{4,2} + 0 + 0 + 0 = k_{2,4} \\ x_{3,1}a_{4,1} + 0 + x_{3,3}a_{4,3} + 0 + 0 = 0 \\ x_{4,1}a_{4,1} + 0 + 0 + x_{4,4}a_{4,4} + 0 = k_{4,4} \\ x_{5,1}a_{4,1} + 0 + 0 + 0 + x_{5,5}a_{4,5} = 0 \end{cases}$$

$$k_{1,4} = (k_{4,4} - w_{1,1}k_{1,1})w_{1,2}^{-1}$$

$$k_{2,4} = (k_{4,4} - w_{2,1}k_{2,2})w_{2,2}^{-1}$$

(5) for $V_5$, $k_{5,5}$ can be derived by $V_1$, $V_3$ and $V_5$, wherein $V_1$ and $V_3$ will derive $k_{5,5}$ via an indirect method; other $V_i$ (i=2, 4) can not derive $k_{5,5}$. Each confidential vector $X_i$ (i=1, 2, ..., 5), the public vector $A_5$ and the key $k_{5,5}$ have the following relationship:

$$X_1 \times A_5^T = k_{1,5}$$

$$X_2 \times A_4^T = 0$$

$$X_3 \times A_5^T = k_{3,5}$$

$$X_4 \times A_5^T = 0$$

$$X_5 \times A_5^T = k_{5,5}$$

$$k_{1,5} = (k_{5,5} - w_{1,1}k_{1,1})w_{1,2}^{-1}$$

$$k_{3,5} = (k_{5,5} - w_{3,1}k_{3,3})w_{3,2}^{-1}$$

suppose $K_5 = (k_{1,5}, 0, k_{3,5}, 0, k_{5,5})^T$, then it can be written in matrix form as $X \times A_5^T = K_5$; while it can also be represented by a system of equations as follows:

$$\begin{cases} x_{1,1}a_{5,1} + x_{1,2}a_{5,2} + 0 + 0 + 0 = k_{1,5} \\ x_{2,1}a_{5,1} + x_{2,2}a_{5,2} + 0 + 0 + 0 = 0 \\ x_{3,1}a_{5,1} + 0 + x_{3,3}a_{5,3} + 0 + 0 = k_{3,5} \\ x_{4,1}a_{5,1} + 0 + 0 + x_{4,4}a_{5,4} + 0 = 0 \\ x_{5,1}a_{5,1} + 0 + 0 + 0 + x_{5,5}a_{5,5} = k_{5,5} \end{cases} \quad (6)$$

$$k_{1,5} = (k_{5,5} - w_{1,1}k_{1,1})w_{1,2}^{-1}$$

$$k_{3,5} = (k_{5,5} - w_{3,1}k_{3,3})w_{3,2}^{-1}$$

Let $A = (A_1^T, A_2^T, \ldots, A_7^T)$; $K = (K_1, K_2, \ldots, K_7)$.

It can be obtained that $X \times A = K$ from the above (1) to (5), that is:

$$\begin{bmatrix} x_{11} & x_{12} & 0 & 0 & 0 \\ x_{21} & x_{22} & 0 & 0 & 0 \\ x_{31} & 0 & x_{33} & 0 & 0 \\ x_{41} & 0 & 0 & x_{44} & 0 \\ x_{51} & 0 & 0 & 0 & x_{55} \end{bmatrix}$$

-continued $$\begin{bmatrix} a_{11} & a_{21} & a_{31} & a_{41} & a_{51} \\ a_{12} & a_{22} & a_{32} & a_{42} & a_{52} \\ a_{13} & a_{23} & a_{33} & a_{43} & a_{53} \\ a_{14} & a_{24} & a_{34} & a_{44} & a_{54} \\ a_{15} & a_{25} & a_{35} & a_{45} & a_{55} \end{bmatrix} = \begin{bmatrix} k_{11} & k_{12} & k_{13} & k_{14} & k_{15} \\ 0 & k_{22} & 0 & k_{24} & 0 \\ 0 & 0 & k_{33} & 0 & k_{35} \\ 0 & 0 & 0 & k_{44} & 0 \\ 0 & 0 & 0 & 0 & k_{55} \end{bmatrix}$$

As long as the determinant $|X| \neq 0$, then A has a unique solution.

The matrix A calculated and the mapping parameter are broadcasted or multicasted by CC to all the subgroup controllers $SC_i$ via public channel, wherein i=1, 2, ..., 5;

Step 4, after all the subgroup controllers receive the public matrix A and the mapping parameter r, the new vector is calculated through $f(\bullet,\bullet)$ and the mapping parameter r:

For any subgroup $V_i$, its subgroup controller is $SC_i$, wherein $X_i=(x_{i,1}, x_{i,2}, \ldots, x_{i,5})$, $x_{i,1}=f(z_{i,1},r)$, $x_{i,2}=f(z_{i,2},r)$, and the other $x_{i,j}=0$ (j≠1, j≠i and j=1, ..., 5); $W_i=(w_{i,1},w_{i,2})$, $w_{i,1}=f(y_{i,1},r)$, $w_{i,2}=f(y_{i,2},r)$. All the $k_{i,j}$ (j=1, ..., 5), that is, $k_{i,1}$, $k_{i,2}$, $k_{i,3}$, $k_{i,4}$, $k_{i,5}$, are calculated according to the equation (9). If j=i, then $k_{i,j}=k_{i,i}$, that is the key of the subgroup. If j≠i and $k_{i,j} \neq 0$, then the group key $k_{j,j}$ of the subgroup $V_j$ is calculated according to the equation (10). For example, for $V_3$, $X_3=(x_{3,1}, 0, x_{3,3}, 0, 0)$ and $W_3=(w_{3,1},w_{3,2})$ are calculated after $SC_3$ receives A and r:

$$x_{3,1}=f(z_{3,1},r), w_{3,1}=f(y_{3,1},r)$$

$$x_{3,3}=f(z_{3,2},r), w_{3,2}=f(y_{3,2},r)$$

$k_{3,1}$-$k_{3,5}$ are calculated according to the equation (9), wherein $k_{3,3} \neq 0$ and $k_{3,5} \neq 0$. $k_{3,3}$ is the group key of the subgroup $V_3$; $k_{3,5}$ is the indirect key for $SC_3$ to calculate the group key $k_{5,5}$ of the subgroup $V_5$. According to the equation (10), $k_{5,5}=w_{3,1}k_{3,3}+w_{3,2}k_{3,5}$.

The calculated $k_{3,3}$ and $k_{5,5}$ are sent by $SC_3$ to group members through the key management scheme in the group.

Figure 11:
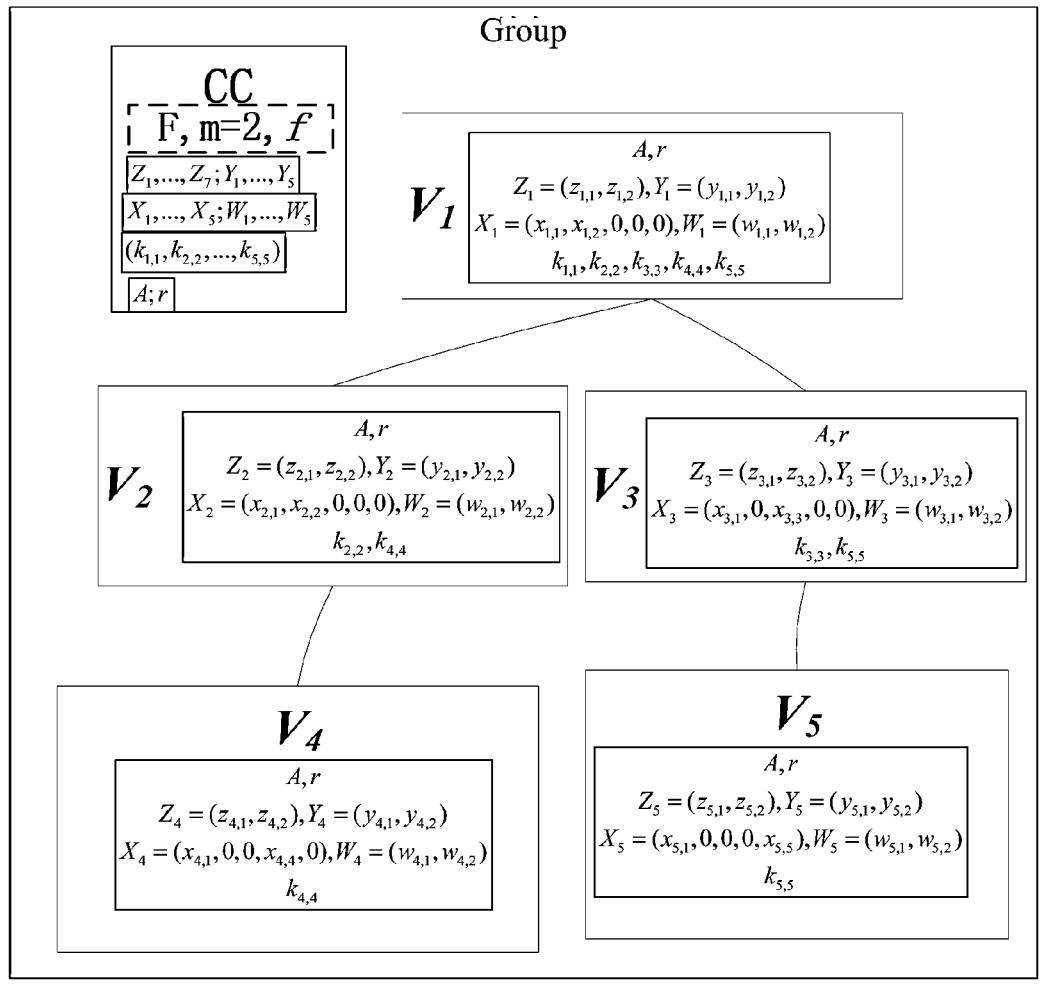
FIG. 11 is a schematic diagram showing the variables and the relationship of CC and $SC_i$ after the group is established according to the third embodiment of the invention.

As shown in FIG. 11, a group with hierarchical access control and seven subgroups is established through the above steps. The hierarchical relationship between subgroups is contained in the public vector A and the private vectors of each subgroup.

Embodiment 4

Figure 12:
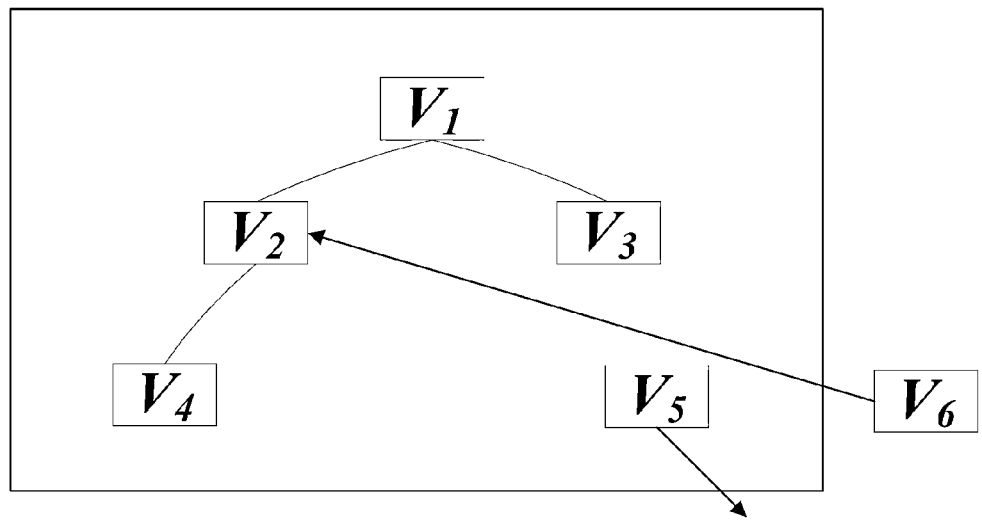
FIG. 12 is a schematic diagram that subgroups join in and leave the group simultaneously according to a fourth embodiment of the invention.

When the relationship between the subgroups is changed, as shown in FIG. 12: $V_5$ would like to leave the group, and $V_6$ would like to join in the group as a new subgroup of $V_2$.

Figure 13:
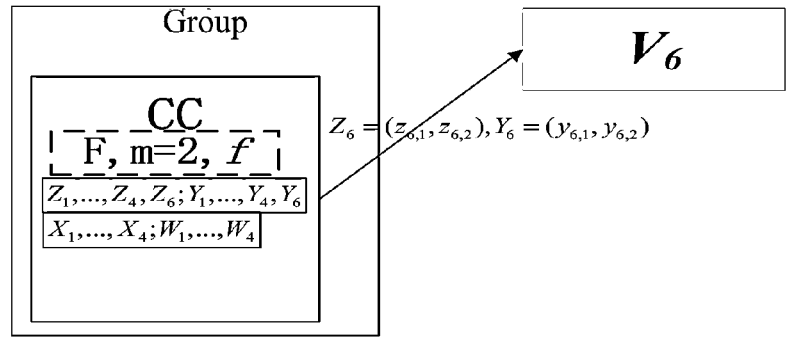
FIG. 13 is a schematic diagram showing the communication of CC and a new joining subgroup $SC_i$ according to the fourth embodiment of the invention.

Step 1, as shown in FIG. 13, $SC_5$ sends a request for leaving to CC, and then CC deletes the private vectors $Z_5$ and $W_5$ of $V_5$ after receiving the request for leaving; then CC selects a m-dimensional private vector $Z_6$ and a two-dimensional private vector $Y_6$ randomly over the finite field F and sends them via secure channel to the subgroup controller of $V_6$ which stores them and keeps secret after receiving $Z_6$ and $Y_6$.

The central controller CC reassigns the serial numbers for the current subgroup controllers, wherein $SC_1$-$SC_4$ remain unchanged, and the corresponding m-dimensional private vectors and the two-dimensional private vectors are $Z_1$-$Z_4$ and $Y_1$-$Y_4$ respectively. The serial number of the subgroup controller of the new joining subgroup $V_6$ is $SC_5$, and the corresponding private vectors are $Z_5$ and $Y_5$. At this time, the private vectors stored by CC are $Z_i$ and $Y_i$ (i=1, 2, ..., 5), and the hierarchical relationship of the group is shown in FIG. 12.

The other steps are identical to the steps 2 to 4 of Embodiment 1. It should be noted that for $SC_5$, the relationship of each private vector $X_i$, $W_i$ (i=1, 2, ..., 5), the public vector $A_5$ and the subgroup key $k_{5,5}$ is different from the item (5) of the step 3 of the Embodiment 1, the other items remain the same and the corresponding relationship after $SC_5$ is changed is as follows:

For $SC_5$, $V_5$ can derive $k_{5,5}$ directly, while $V_1$, $V_2$ and $V_7$ can derive $k_{5,5}$ indirectly, but $V_3$ and $V_4$ can not derive $k_{5,5}$. Each private vector $X_i$ (i=1, 2, ..., 5), the public vector $A_5$ and the key $k_{5,5}$ have the following relationship:

$$X_1 \times A_5^T = k_{1,5}$$

$$X_2 \times A_5^T = k_{2,5}$$

$$X_3 \times A_5^T = 0$$

$$X_4 \times A_5^T = 0$$

$$X_5 \times A_5^T = k_{5,5}$$

$$k_{1,5} = (k_{5,5} - w_{1,1} k_{1,1}) w_{1,2}^{-1}$$

$$k_{2,5} = (k_{5,5} - w_{2,1} k_{2,2}) w_{2,2}^{-1}$$

Suppose $K_5 = (k_{1,5}, k_{2,5}, 0, 0, k_{5,5})^T$, then it can be written in matrix form as $X \times A_5^T = K_5$; while it can also be represented by a system of equations as follows:

$$\begin{cases} x_{1,1} a_{5,1} + x_{1,2} a_{5,2} + 0 + 0 + 0 = k_{1,5} \\ x_{2,1} a_{5,1} + x_{2,2} a_{5,2} + 0 + 0 + 0 = k_{2,5} \\ x_{3,1} a_{5,1} + 0 + x_{3,3} a_{5,3} + 0 + 0 = 0 \\ x_{4,1} a_{5,1} + 0 + 0 + x_{4,4} a_{5,4} + 0 = 0 \\ x_{5,1} a_{5,1} + 0 + 0 + 0 + x_{5,5} a_{5,5} = k_{5,5} \end{cases}$$

$$k_{1,5} = (k_{5,5} - w_{1,1} k_{1,1}) w_{1,2}^{-1}$$

$$k_{2,5} = (k_{5,5} - w_{2,1} k_{2,2}) w_{2,2}^{-1}$$

The other details are identical to that of the step 3 of the Embodiment 3.

Figure 14:
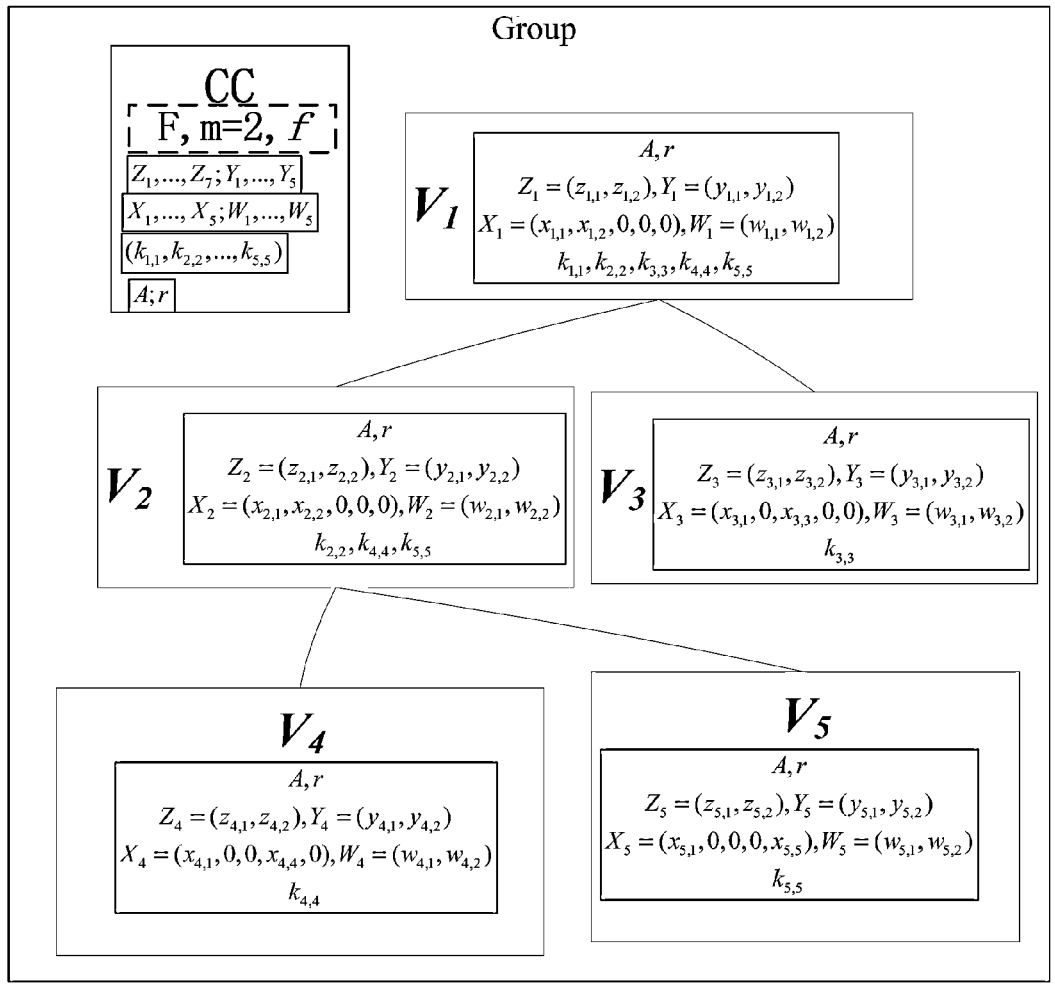
FIG. 14 is a schematic diagram showing that a new group is established after the group has finished all the operations regarding the joining and leaving of subgroups according to the fourth embodiment of the invention.

As shown in FIG. 14, the bulk operation of joining and leaving of groups is done through the above steps, and the new hierarchical relationship is also reflected in the public vector A and each confidential vector $X_i$ (i=1, 2, ..., 5). Joining or leaving separately can be regarded as a special form of the bulk operation. During the joining operation of new groups, the secure channel only exists when the new group sends the private vector to CC, and the other groups (original groups) do not need to resend the private vectors to CC.

It should be emphasized that the above-described embodiments can be combined freely. Many variations and modifications, replacements, combinations and simplifications may be made to the above-described embodiment(s) of the invention without departing substantially from the spirit and principles of the invention. All such modifications and variations are intended to be included herein within the scope of this disclosure and the present invention and protected by the following claims.

What is claimed is:

1. A computer-enabled method of managing group keys based on linear geometry, comprising the following steps:

selecting a mapping f and a finite field F, by a central controller, for use by a group, wherein all computations in the group are performed over the finite field F;

determining a constant N, by the central controller, to be used as an upper limit of the number of subgroups (n);

sending the finite field F, the constant N and the mapping f, by the central controller, to subgroup controllers;

assigning a serial number, by the central controller, for each subgroup;

sending each serial number, by the central controller, to each subgroup controller;

selecting a N-dimensional private vector randomly, by the central controller, for each subgroup;

sending each N-dimensional private vector, by the central controller, to each subgroup controller correspondingly via secure channel;

receiving and storing and keeping secret the N-dimensional private vectors, by the subgroup controllers, from the central controller, wherein N and n are positive integers, and n≤N;

selecting a mapping parameter r in the finite field F, by the central controller;

mapping, by the central controller, the private vectors of all the subgroup controllers into a new set of vectors called confidential vectors in a vector space by using the mapping f according to the mapping parameter r;

upon determining, by the central controller, that the new set of vectors is linearly dependent, reselecting, by the controller, the mapping parameter to perform remapping or allowing each subgroup controller to reselect a private vector, until the new set of vectors is linearly independent;

selecting a subgroup key in the finite field F for each subgroup, by the central controller;

constructing, by the central controller, n linear systems of equations according to the hierarchy relationship of the subgroups by using the confidential vectors and the subgroup keys;

calculating, by the central controller, the unique solutions of the linear systems of equations which are called public vectors; wherein the confidential vectors and the public vectors are subject to the following regulations:

(1) the confidential vectors of lower level nodes are orthogonal to the public vectors of higher level nodes, and the inner product is zero;

(2) for all the nodes, the inner product of the confidential vector and the public vector of a current node itself is the group key of the current node;

(3) when the higher level node is a parent node or ancestor node of the current node, the inner product of the confidential vector of the higher level node and the public vector of the current node is the group key of the current node; the inner product of the confidential vector of the higher level node and the public vector of a descendant node is the group key of the descendant node (4) for nodes without direct nor indirect ancestor-descendant relationship with respect to each other, the inner product of the confidential vector of one node and the public vector of the other node is zero (5) the key of one node can not be derived by the other node between brother nodes, and the inner product of the confidential vector of one node and the public vector of the other node is zero;

broadcasting or multicasting a public matrix and the mapping parameter r, by the central controller, to all the subgroup controllers via open channel, wherein the public matrix is formed by n sets of public vectors;

receiving, by each subgroup controller, the public matrix and the mapping parameter;

mapping, by each subgroup controller, the private vector of its own to a new vector in a vector space according to the parameter;

solving, by each subgroup controller, a confidential vector of its own;

obtaining, by each subgroup controller, a set of key vectors by computation of the confidential vector and the public matrix;

obtaining, by the subgroup controller, its group key and the group keys of descendant subgroups through the key vector calculated by itself; and distributing, by the subgroup controller, the group keys calculated to subgroup members.

2. The computer-enabled method of claim 1, wherein the serial number assigned to each subgroup is $SC_i$, and wherein the N-dimensional private vector is $Z_i=(z_{1,i}, z_{i,2}, \ldots, z_{i,N})$, and wherein $SC_i$ is sent to each subgroup controller via broadcasting or multicasting, and wherein the mapping of the private vectors to the confidential vectors using the mapping f comprises:

for the subgroup controller $SC_i$:

$$x_{i,1} = f(z_{i,1}, r)$$
$$x_{i,2} = f(z_{i,2}, r)$$
$$\ldots,$$
$$x_{i,n} = f(z_{i,n}, r)$$

and wherein the new set of vectors over the finite field F consists of:

$$X_1 = (x_{1,1}, x_{1,2}, \ldots, x_{1,n}),$$
$$X_2 = (x_{2,1}, x_{2,2}, \ldots, x_{2,n}),$$
$$\ldots,$$
$$X_n = (x_{n,1}, x_{n,2}, \ldots, x_{n,n})$$

and wherein the subgroup key is a random number $k_1, k_2, \ldots, k_n$ wherein $k \neq 0$; for any subgroup $V_i$, and wherein P(i) represents a set of all ancestor nodes of the subgroup $V_i$ and the vector $A_i=(a_{i,1}, a_{i,2}, \ldots, a_{i,n})$ is an unknown parameter, and wherein the public vector $A_i$ and the confidential vector $X_j$ of each subgroup have the following relationship:

$$X_j \times A_i^T = \begin{cases} k_i, & \text{if } j = i \text{ or } V_j \in P(i) \\ 0, & V_j \notin P(i) \text{ and } j \neq i \end{cases} \quad (1)$$

wherein, $i=1, \ldots, n$ and $j=1, \ldots, n$;

and wherein $X=(X_1, X_2, \ldots, X_n)^T$, $K_i=(c_{i,1}, c_{i,2}, \ldots, c_{i,n})^T$, $$c_{i,j} = \begin{cases} k_i, & \text{if } j = i \text{ or } V_j \in P(i) \\ 0, & V_j \notin P(i) \text{ and } j \neq i, \end{cases}$$

wherein the equation (1) is converted into:

$$X \times A_i^T = K_i \quad (2)$$

let $A=(A_1^T, A_2^T, \ldots, A_n^T)$, $K=(K_1, K_2, \ldots, K_n)$, such that for all subgroups $V_i$ it is obtained that:

$$X \times A = K \quad (3)$$

solving, by the central controller, the system of equations (3) wherein the system of equations (3) has a unique solution since the linear independence of $X_1, X_2, \ldots, X_n$ guarantees the coefficient matrix determinant $|X| \neq 0$, and wherein A is the public matrix solved;

broadcasting or multicasting the public matrix $A=(A_1^T, A_2^T, \ldots, A_n^T)$ and the mapping parameter r by the central controller to all the subgroup controllers via open channel;

receiving, by each subgroup controller, the public matrix $A=(A_1^T, A_2^T, \ldots, A_n^T)$ and the mapping parameter r, calculating, by the subgroup controller, $X_i=(x_{i,1}, x_{i,2}, \ldots, x_{i,n})$ via the mapping f:

$$x_{i,1} = f(z_{i,1}, r)$$
$$x_{i,2} = f(z_{i,2}, r)$$
$$\ldots,$$
$$x_{i,n} = f(z_{i,n}, r);$$

calculating, by each subgroup controller:

$$k_i = X_i \times A_i^T = x_{i,1} a_{i,1} + x_{i,2} a_{i,2} + \ldots + x_{i,n} a_{i,n} \quad (4)$$

$$\text{when } j \neq i, \ t_j = X_i \times A_j^T = x_{j,1} a_{i,1} + x_{j,2} a_{i,2} + \ldots + x_{j,n} a_{i,n} \quad (5)$$

wherein $i=1, n; j=1, n$, P(j) represents the set of all ancestor nodes of the subgroup $V_i$;

and wherein if $V_i \in P(j)$, then $t_j=k_j$, i.e. the group key of $V_j$; or else, $t_j=0$; each subgroup $V_i$ calculates its group key or the group keys of its descendant nodes via the equations (4) and (5); and sending, by the subgroup controller $SC_i$, the calculated $k_i$ and $t_j$ ($j \neq i$) to each group member.

3. The computer-enabled method of claim 1, further comprising:

when new subgroups join in, assigning and sending, by the central controller, a serial number to each new subgroup controller;

selecting, by the central controller, a N-dimensional private vector over the finite field F for each new subgroup;

sending, by the central controller, the N-dimensional private vector to the corresponding subgroup controller via secure channel;

receiving and storing and keeping secret, by the new subgroup controller, the N-dimensional private vector of each new group member sent by the central controller; and sending, by the central controller, the finite field F, the constant N, and the mapping f to the new subgroup controller.

4. The computer-enabled method of claim 1, further comprising:

when subgroups need to leave, applying, by each subgroup member that needs to leave, to the central group controller for leaving the group;

deleting, by the central group controller, the private vectors of the leaving subgroups;

reassigning, by the central group controller, serial numbers according to the size order of the subscripts of the current subgroup members, and sending, by the central group controller, the serial numbers to all subgroup controllers by broadcasting or multicasting.

5. A computer-enabled method of managing group keys based on linear geometry, comprising the following steps:
selecting a mapping f and a finite field F, by the central controller, for use by a group, wherein all computations in the group are performed over the finite field F;
determining a constant m, by the central controller;
sending the finite field F, the constant m and the mapping f, by the central controller, to all subgroup controllers;
upon determining the group has n subgroups, assigning, by the central controller, a serial number for each subgroup;
sending, by the central controller, each serial number to the corresponding subgroup controller;
selecting, by the central controller, selects a m-dimensional private vector and a two-dimensional private vector randomly for each subgroup;
sending, by the central controller, the m-dimensional private vector and the two-dimensional private vector to each subgroup controller correspondingly via secure channel;
receiving and storing and keeping secret, by the subgroup controllers, the m-dimensional private vectors and the two-dimensional private vectors, wherein m and n are positive integers, and $2 \leq m \leq n$;
selecting, by the central controller, a mapping parameter r in the finite field F;
mapping, by the central controller, the two-dimensional private vectors of all the subgroup controllers into a new set of vectors by using the mapping f according to the mapping parameter r;
mapping, by the central controller, the m-dimensional private vectors of all the subgroup controllers into a new set of vectors by using the mapping f according to the mapping parameter r;
upon determining, by the central controller, that the new set of vectors is linearly dependent, reselecting the mapping parameter to perform remapping, or allowing each subgroup controller to reselect a private vector, until the new set of vectors is linearly independent; wherein these two new sets of subgroups are called confidential vectors;
selecting, by the central controller, a subgroup key in the finite field F for each subgroup;
constructing, by the central controller, n linear systems of equations according to the hierarchy relationship of the subgroups by using the confidential vectors and the subgroup keys;
calculating, by the central controller, the unique solutions of the linear systems of equations which are called public vectors; wherein the confidential vectors and the public vectors are subject to the following regulations:
(1) for all the nodes, the inner product of the m-dimensional confidential vector and the public vector of a current node itself is the group key of the current node;
(2) the m-dimensional confidential vectors of lower level nodes are orthogonal to the public vectors of higher level nodes, and the inner product is zero;
(3) if the higher level node is a parent node or ancestor node of the current node, the inner product of the m-dimensional confidential vector of the higher level node and the public vector of the current node is the indirect key; the higher level node further calculates the key of the descendant node via the indirect key and the two-dimensional confidential vector of the higher level node itself;
(4) for nodes without direct nor indirect ancestor-descendant relationship with respect to each other, the inner product of the m-dimensional confidential vector of one node and the public vector of the other node is zero;
(5) the key of one node can not be derived by the other node between brother nodes, and the inner product of the m-dimensional confidential vector of one node and the public vector of the other is zero;
broadcasting or multicasting, by the central controller, n sets of public vectors form a public matrix, and the public matrix and the mapping parameter r to all the subgroup controllers via open channel;
after receiving the public matrix and the mapping parameter, mapping, by each subgroup controller, two private vectors of its own to two new vectors called confidential vectors in a vector space according to the mapping parameter;
obtaining, by each subgroup controller, a set of key vectors by linear transformation of the m-dimensional confidential vector and the public matrix;
obtaining, by the subgroup controller, its group key through the key vector calculated by itself;
calculating, by the subgroup controller, the group keys of descendant subgroups through the two-dimensional confidential vector and the group key of its own, wherein the descendant subgroups can not calculate the group keys of its parent group and ancestor groups; and
distributing, by the subgroup controller, the calculated group keys to group members.

6. The computer-enabled method of claim 5, wherein the method further comprises:
when new subgroups join in, selecting, by the central controller, a m-dimensional private vector $Z_i=(z_{i,1}, z_{i,2}, \ldots, z_{i,m})$ and a two-dimensional private vector $Y_i=(y_{i,1}, y_{i,2})$ for each new subgroup controller over the finite field F,
sending, by the central controller, $Z_i$ and $Y_i$ to the corresponding subgroup controller;
assigning, by the central controller, a serial number to each new subgroup controller,
sending, by the central controller, the serial number to all subgroup controllers;
receiving and storing and keeping secret, by the new subgroup controller, the m-dimensional private vector and the two-dimensional private vector sent by the central controller; and
sending, by the central controller, the finite field F, the constant N, and the mapping f to the new subgroup controllers.

7. The computer-enabled method of claim 5, wherein the method further comprises:
when subgroups need to leave, applying, by each subgroup member that needs to leave, to the central group controller for leaving the group;
deleting, by the central group controller, the private vectors of the leaving subgroups,
reassigning, by the central controller, serial numbers according to the size order of the subscripts of the current subgroup members, and
sending, by the central controller, the serial numbers to all subgroup controllers by broadcasting or multicasting.

8. The computer-enabled method of claim 5, wherein m is 2.

9. The computer-enabled method of claim 5, the method further comprising:

if no group member joins in or leaves the group for a preset period of time, updating, by the group controller, the group key of each subgroup periodically;

reselecting, by the group controller, a new private vector for each subgroup;

sending, by the group controller, the new private vector to the corresponding subgroup controller, receiving and storing and keeping secret, by the subgroup controller, the new private vector;

reselecting, by the central controller, the mapping parameter and the group key of each subgroup;

calculating, by the central controller, the public matrix; and broadcasting or multicasting, by the central controller, the public matrix and the mapping parameter to all subgroup controllers via open channel.

10. The computer-enabled method of claim 1, the method further comprising:

if no group member joins in or leaves the group for a preset period of time, updating, by the group controller, the group key of each subgroup periodically;

reselecting, by the group controller, a new private vector for each subgroup;

sending, by the group controller, the new private vector to the corresponding subgroup controller, receiving and storing and keeping secret, by the subgroup controller, the new private vector;

reselecting, by the central controller, the mapping parameter and the group key of each subgroup;

calculating, by the central controller, the public matrix; and broadcasting or multicasting, by the central controller, the public matrix and the mapping parameter to all subgroup controllers via open channel.

11. The computer-enabled method of claim 5, wherein the subgroup controllers are $SC_i$, and wherein the m-dimensional private vector is $Z_i=(z_{i,1}, z_{i,2}, \ldots, z_{i,m})$, and wherein the two-dimensional private vector is $Y_i=(y_{i,1}, y_{i,2})$ over the finite filed F for each subgroup $V_i$, and wherein the serial number $SC_i$ is sent to all the subgroup controllers by broadcasting or multicasting, and wherein $i=1, \ldots, n$, and wherein the central controller selects the mapping parameter r in the finite field F randomly, and maps the private vectors $Z_i$ of all the subgroups into a new set of vectors $X_i$ by using the mapping f, the method further comprising:

mapping, by the central controller, the private vectors $Y_i$ of all the subgroups into a new set of vectors $W_i$, wherein $X_i$ and $W_i$ are called confidential vectors, wherein:

$$\text{for all subgroups } SC_i, i = 1, \ldots, n, \quad (1)$$
$$\text{the vector } W_i = (w_{i,1}, w_{i,2}):$$
$$w_{i1} = f(y_{i,1}, r)$$
$$w_{i2} = f(y_{i,2}, r)$$

$$\text{for } i = 1, \ldots, m, X_i = (x_{i,1}, \ldots, x_{i,m}, 0, \ldots, 0): \quad (2)$$
$$x_{i,1} = f(z_{i,1}, r)$$
$$\ldots$$
$$x_{i,m} = f(z_{i,m}, r)$$
$$\text{let } x_{i,m+1} = \ldots = x_{i,n} = 0;$$

$$\text{for } i = m+1, \ldots, n, \quad (3)$$
$$X_i = (x_{i,1}, x_{i,2}, \ldots, x_{i,m-1}, 0\ldots, 0_{x_{i,i}}, 0, \ldots, 0)$$
$$x_{i,1} = f(z_{i,1}, r)$$
$$\ldots$$
$$x_{i,m-1} = f(z_{i,m-1}, r)$$
$$x_{i,i} = f(z_{i,m}, r)$$
$$\text{let } x_{i,m} = \ldots = x_{i,i-1} = 0, x_{i,i+1} = \ldots = x_{i,n} = 0;$$

obtaining, by central controller, obtains a set of n-dimensional vectors consisting of $X_i$ over the finite field F:

$$X_1 = (x_{1,1}, x_{1,2}, \ldots, x_{1,n})$$
$$X_2 = (x_{2,1}, x_{2,2}, \ldots, x_{2,n})$$
$$\ldots$$
$$X_n = (x_{n,1}, x_{n,2}, \ldots, x_{n,n});$$

upon determining that $X_1, X_2, \ldots, X_n$ are linearly dependent, reselecting the mapping parameter and remapping, by the central controller, or allowing the subgroup controller to reselect a private vector until the new set of vectors are linearly independent;

wherein the group key is $k_{i,i}=1, \ldots, n$, for each subgroup $V_i$; and wherein for any subgroup controller $SC_i= 1, \ldots, n$, suppose its the public vector $A_i=(a_{i,1}, a_{i,2}, \ldots a_{i,n})$ is an unknown parameter, and $C(V_i)$ is used to represent the set of all descendant groups of the subgroup controller $SC_i$, and the public vector $A_i$ and the confidential vector $X_i$ of each subgroup have the following relationship:

$$X_i \times A_i^T = k_{i,i}$$

wherein $V_j \in C(V_i)$, i.e. $V_j (j=1, \ldots, n)$ is the direct or indirect descendant group of $V_i$ and $j \neq i$, and $A_j$, $X_i$, $W_i$ and $X_j$ have the following relationship:

$$\begin{cases} X_j \times A_j^T = k_{j,j} \\ X_i \times A_j^T = k_{i,j} \\ W_i \times (k_{i,i}, k_{i,j})^T = k_{j,j} \end{cases} \quad (6)$$

and wherein:

$$X_i \times A_j^T = k_{i,j} = \begin{cases} k_{i,i}, & j = i \\ (k_{j,j} - w_{i,1} k_{i,i}) w_{i,2}^{-1}, & j \neq i \cap V_j \in C(V_i) \\ 0, & j \neq i \cap V_j \notin C(V_i) \end{cases} \quad (7)$$

wherein, $i=1, \ldots, n$, and wherein $X=(X_1, X_2, \ldots, X_n)$, $K_i=(k_{i,1}, k_{i,2}, \ldots, k_{i,n})^T$, and the equation (7) is transformed into:

$$X \times A^T = K_i$$

wherein $A=(A_1^T, A_2^T, \ldots, A_n^T)$ $K=(K_1, K_2, \ldots, K_n)$, and for all $V_i$:

$$X \times A = K \quad (8)$$

the equation (8) is written in the form of a system of equations:

$$\begin{bmatrix} x_{1,1} & x_{1,2} & \ldots & x_{1,n} \\ x_{2,1} & x_{2,2} & \ldots & x_{2,n} \\ \ldots & \ldots & \ldots & \ldots \\ x_{n,1} & x_{n,2} & \ldots & x_{n,n} \end{bmatrix} \times \begin{bmatrix} a_{1,1} & a_{2,1} & \ldots & a_{n,1} \\ a_{1,2} & a_{2,2} & \ldots & a_{n,2} \\ \ldots & \ldots & \ldots & \ldots \\ a_{1,n} & a_{2,n} & \ldots & a_{n,n} \end{bmatrix} = \begin{bmatrix} k_{1,1} & k_{1,2} & \ldots & k_{1,n} \\ k_{2,1} & k_{2,2} & \ldots & k_{2,n} \\ \ldots & \ldots & \ldots & \ldots \\ k_{n,1} & k_{n,2} & \ldots & k_{n,n} \end{bmatrix}$$

and wherein the system of equations (8) has a unique solution: $A = X^{-1}K$, since the coefficient matrix determinant $|X| \neq 0$, and A is the public matrix solved; and wherein the mapping parameter r and the matrix $A = (A_1^T, A_2^T, \ldots, A_n^T)$ are broadcasted or multicasted by the central controller to all the subgroup controllers via open channel;

and wherein each subgroup controller $SC_i$ calculates $W_i$ and $X_i$ according to the serial number i of its own and the mapping f:

for all the $i = 1, \ldots, n$, $W_i = (w_{i,1}, w_{i,2})$     (1)
$w_{i,1} = f(y_{i,1}, r)$
$w_{i,2} = f(y_{i,2}, r)$ for $i = 1, \ldots, m$, $X_i = (x_{i,1}, \ldots, x_{i,m}, 0, \ldots, 0)$:     (2)
$x_{i,1} = f(z_{i,1}, r)$
...
$x_{i,m} = f(z_{i,m}, r)$
let $x_{i,m+1} = \ldots = x_{i,n} = 0$;

for $i = m+1, \ldots, n$,     (3)
$X_i = (x_{i,1}, x_{i,2}, \ldots, x_{i,m-1}, 0 \ldots, 0_{x_{i,i}}, 0, \ldots, 0)$
$x_{i,1} = f(z_{i,1}, r)$
...
$x_{i,m-1} = f(z_{i,m-1}, r)$
$x_{i,i} = f(z_{i,m}, r)$
let $x_{i,m} = \ldots = x_{i,i-1} = 0, x_{i,i+1} = \ldots = x_{i,n} = 0$;
then calculate, for all the $j = 1, \ldots, n$, $$k_{i,j} = \begin{cases} X_i \times A_j^T = x_{i,1} a_{j,1} + \ldots + x_{i,m} a_{j,m}, & i \leq m \\ X_i \times A_j^T = x_{i,1} a_{j,1} + \ldots + x_{i,m-1} a_{j,m-1} + x_{i,i} \cdot a_{j,i}, & i > m \end{cases} \quad (9)$$

and wherein if j=i, $k_{ij} = k_{i,i}$, i.e. the key of the subgroup $V_i$ itself; if j≠i, the subgroup controller $SC_i$ continues to calculate $k_{j,j}$ if $k_{i,j} \neq 0$:

$k_{j,j} = w_{i,1} \times k_{i,i} + w_{i,2} \times k_{i,j}$     (10)

and wherein each subgroup controller $SC_i$ calculates the key $k_{i,i}$ and the key $k_{j,j}$ of each descendant subgroup via the equations (9) and (10);

and wherein the subgroup controller $SC_i$ distributes the $k_{i,i}$ and $k_{j,j}$ (j=1, . . . , n and j≠i) calculated to each group member.

12. A non-transitory computer-readable storage medium comprising computer-executable instructions for managing group keys based on linear geometry, the computer-executable instructions comprising instructions for:

selecting a mapping f and a finite field F, by a central controller, for use by a group, wherein all computations in the group are performed over the finite field F;

determining a constant N, by the central controller, to be used as an upper limit of the number of subgroups (n);

sending the finite field F, the constant N, and the mapping f, by the central controller, to subgroup controllers;

assigning a serial number, by the central controller, for each subgroup;

sending each serial number, by the central controller, to each subgroup controller;

selecting a N-dimensional private vector randomly, by the central controller, for each subgroup;

sending each N-dimensional private vector, by the central controller, to each subgroup controller correspondingly via secure channel;

receiving and storing and keeping secret the N-dimensional private vectors, by the subgroup controllers, from the central controller, wherein N and n are positive integers, and n≤N;

selecting a mapping parameter r in the finite field F, by the central controller;

mapping, by the central controller, the private vectors of all the subgroup controllers into a new set of vectors called confidential vectors in a vector space by using the mapping f according to the mapping parameter r;

determining, by the controller, if the new set of vectors is linearly dependent;

reselecting, by the controller, the mapping parameter to perform remapping;

selecting a subgroup key in the finite field F for each subgroup, by the central controller;

constructing, by the central controller, n linear systems of equations according to the hierarchy relationship of the subgroups by using the confidential vectors and the subgroup keys;

calculating, by the central controller, the unique solutions of the linear systems of equations which are called public vectors, wherein the confidential vectors of lower level nodes are orthogonal to the public vectors of higher level nodes, and wherein the inner product is zero, and wherein for all the nodes, the inner product of the confidential vector and the public vector of a current node itself is the group key of the current node, and wherein when the higher level node is a parent node or ancestor node of the current node, and wherein the inner product of the confidential vector of the higher level node and the public vector of the current node is the group key of the current node, and wherein the inner product of the confidential vector of the higher level node and the public vector of a descendant node is the group key of the descendant node, and wherein for nodes without direct nor indirect ancestor-descendant relationship with respect to each other, the inner product of the confidential vector of one node and the public vector of the other node is zero, and wherein the key of one node can not be derived by the other node between brother nodes, and the inner product of the confidential vector of one node and the public vector of the other node is zero;

broadcasting or multicasting a public matrix and the mapping parameter r, by the central controller, to all the subgroup controllers via open channel, wherein the public matrix is formed by n sets of public vectors;

receiving, by each subgroup controller, the public matrix and the mapping parameter;

mapping, by each subgroup controller, the private vector of its own to a new vector in a vector space according to the parameter;

solving, by each subgroup controller, a confidential vector of its own;

obtaining, by each subgroup controller, a set of key vectors by computation of the confidential vector and the public matrix;

obtaining, by the subgroup controller, its group key and the group keys of descendant subgroups through the key vector calculated by itself; and distributing, by the subgroup controller, the group keys calculated to subgroup members.

13. A non-transitory computer-readable storage medium comprising computer-executable instructions for managing group keys based on linear geometry, the computer-executable instructions comprising instructions for:

selecting a mapping f and a finite field F, by the central controller, for use by a group, wherein all computations in the group are performed over the finite field F;

determining a constant m, by the central controller;

sending the finite field F, the constant m and the mapping f, by the central controller, to all subgroup controllers;

upon determining the group has n subgroups, assigning, by the central controller, a serial number for each subgroup;

sending, by the central controller, each serial number to the corresponding subgroup controller;

selecting, by the central controller, a m-dimensional private vector and a two-dimensional private vector randomly for each subgroup;

sending, by the central controller, the m-dimensional private vector and the two-dimensional private vector to each subgroup controller correspondingly via secure channel;

receiving and storing and keeping secret, by the subgroup controllers, the m-dimensional private vectors and the two-dimensional private vectors, wherein m and n are positive integers, and $2 \leq m \leq n$;

selecting, by the central controller, a mapping parameter r in the finite field F;

mapping, by the central controller, the two-dimensional private vectors of all the subgroup controllers into a new set of vectors by using the mapping f according to the mapping parameter r;

mapping, by the central controller, the m-dimensional private vectors of all the subgroup controllers into a new set of vectors by using the mapping f according to the mapping parameter r;

upon determining, by the central controller, that the new set of vectors is linearly dependent, reselecting the mapping parameter to perform remapping, or allowing each subgroup controller to reselect a private vector, until the new set of vectors is linearly independent; wherein these two new sets of subgroups are called confidential vectors;

selecting, by the central controller, a subgroup key in the finite field F for each subgroup;

constructing, by the central controller, n linear systems of equations according to the hierarchy relationship of the subgroups by using the confidential vectors and the subgroup keys;

calculating, by the central controller, the unique solutions of the linear systems of equations which are called public vectors; wherein the confidential vectors and the public vectors are subject to the following regulations:

(1) for all the nodes, the inner product of the m-dimensional confidential vector and the public vector of a current node itself is the group key of the current node;

(2) the m-dimensional confidential vectors of lower level nodes are orthogonal to the public vectors of higher level nodes, and the inner product is zero;

(3) if the higher level node is a parent node or ancestor node of the current node, the inner product of the m-dimensional confidential vector of the higher level node and the public vector of the current node is the indirect key; the higher level node further calculates the key of the descendant node via the indirect key and the two-dimensional confidential vector of the higher level node itself;

(4) for nodes without direct nor indirect ancestor-descendant relationship with respect to each other, the inner product of the m-dimensional confidential vector of one node and the public vector of the other node is zero;

(5) the key of one node cannot be derived by the other node between brother nodes, and the inner product of the m-dimensional confidential vector of one node and the public vector of the other is zero;

broadcasting or multicasting, by the central controller, n sets of public vectors form a public matrix, and the public matrix and the mapping parameter r to all the subgroup controllers via open channel;

after receiving the public matrix and the mapping parameter, mapping, by each subgroup controller, two private vectors of its own to two new vectors called confidential vectors in a vector space according to the mapping parameter;

obtaining, by each subgroup controller, a set of key vectors by linear transformation of the m-dimensional confidential vector and the public matrix;

obtaining, by the subgroup controller, its group key through the key vector calculated by itself;

calculating, by the subgroup controller, the group keys of descendant subgroups through the two-dimensional confidential vector and the group key of its own, wherein the descendant subgroups can not calculate the group keys of its parent group and ancestor groups; and distributing, by the subgroup controller, the calculated group keys to group members.

* * * * *